US008964654B2

(12) United States Patent
Golitschek Edler Von Elbwart et al.

(10) Patent No.: US 8,964,654 B2
(45) Date of Patent: Feb. 24, 2015

(54) AVOIDANCE OF FEEDBACK COLLISION IN MOBILE COMMUNICATIONS

(75) Inventors: Alexander Golitschek Edler Von Elbwart, Langen (DE); Joachim Löhr, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 1504 days.

(21) Appl. No.: 12/520,522

(22) PCT Filed: Nov. 15, 2007

(86) PCT No.: PCT/EP2007/009886
§ 371 (c)(1),
(2), (4) Date: Nov. 19, 2009

(87) PCT Pub. No.: WO2008/074380
PCT Pub. Date: Jun. 26, 2008

(65) Prior Publication Data
US 2010/0098006 A1  Apr. 22, 2010

(30) Foreign Application Priority Data

Dec. 20, 2006  (EP) ..................................... 06026509

(51) Int. Cl.
*H04W 4/00* (2009.01)
*H04L 1/18* (2006.01)

(52) U.S. Cl.
CPC ............ *H04L 1/1854* (2013.01); *H04L 1/1861* (2013.01)
USPC ........................................................ 370/329

(58) Field of Classification Search
None
See application file for complete search history.

(56) References Cited

U.S. PATENT DOCUMENTS

| 4,970,714 | A | * | 11/1990 | Chen et al. ..................... 370/471 |
| 5,490,168 | A | * | 2/1996 | Phillips et al. ................ 375/224 |
| 6,021,124 | A | * | 2/2000 | Haartsen ....................... 370/345 |
| 6,163,538 | A | * | 12/2000 | Brown et al. .................. 370/349 |
| 6,292,494 | B1 | * | 9/2001 | Baker et al. ................... 370/459 |

(Continued)

FOREIGN PATENT DOCUMENTS

| EP | 1 389 848 | 2/2004 |
| EP | 1 598 973 | 11/2005 |

(Continued)

OTHER PUBLICATIONS

International Search Report dated Apr. 2, 2008.
(Continued)

*Primary Examiner* — Gregory Sefcheck
*Assistant Examiner* — Joshua Smith
(74) *Attorney, Agent, or Firm* — Dickinson Wright PLLC

(57) ABSTRACT

The invention relates to feedback transmission for data packets in a mobile communication system. In particular the invention provides a communication system wherein feedback information of a retransmission protocol for transmitted data packets is transmitted. Further, the invention relates to a method for determining radio resources for the transmission of feedback information of a retransmission protocol for transmitted data packets as well as to a base station and a mobile station performing the method. In order to prevent potential collisions of feedback information while omitting a destination identifier for identifying the receiver of the feedback, the feedback resources for sending the feedback are determined at least based on a current transmission counter for a packet.

9 Claims, 13 Drawing Sheets

(56) References Cited

U.S. PATENT DOCUMENTS

| | | | |
|---|---|---|---|
| 6,683,527 B1* | 1/2004 | Greenwood | 370/343 |
| 7,069,038 B2* | 6/2006 | Hakkinen et al. | 370/332 |
| 7,844,308 B2* | 11/2010 | Rhee et al. | 455/574 |
| 2002/0061031 A1* | 5/2002 | Sugar et al. | 370/445 |
| 2002/0099854 A1* | 7/2002 | Jorgensen | 370/310 |
| 2003/0087651 A1* | 5/2003 | Rauschmayer | 455/465 |
| 2003/0117956 A1* | 6/2003 | Lee | 370/232 |
| 2003/0206524 A1* | 11/2003 | Mohanty et al. | 370/347 |
| 2003/0224774 A1* | 12/2003 | Cheng et al. | 455/422.1 |
| 2004/0133837 A1* | 7/2004 | Varma et al. | 714/749 |
| 2005/0032522 A1* | 2/2005 | Soong et al. | 455/450 |
| 2005/0042985 A1* | 2/2005 | Cheng et al. | 455/24 |
| 2005/0207364 A1* | 9/2005 | Wood, Jr. | 370/310 |
| 2005/0226198 A1* | 10/2005 | Barak et al. | 370/345 |
| 2005/0281212 A1* | 12/2005 | Jeong et al. | 370/310 |
| 2006/0233200 A1* | 10/2006 | Fifield et al. | 370/473 |
| 2006/0285579 A1* | 12/2006 | Rhee et al. | 375/132 |
| 2007/0002786 A1* | 1/2007 | Herrmann | 370/328 |
| 2007/0211667 A1* | 9/2007 | Agrawal et al. | 370/335 |
| 2007/0286102 A1* | 12/2007 | Shimokawa et al. | 370/310 |
| 2008/0285499 A1* | 11/2008 | Zhang et al. | 370/315 |
| 2009/0129335 A1* | 5/2009 | Lee et al. | 370/331 |

FOREIGN PATENT DOCUMENTS

| | | |
|---|---|---|
| EP | 1 686 753 | 8/2006 |
| WO | 02/45330 | 6/2002 |
| WO | 02/058314 | 7/2002 |
| WO | 2005/009069 | 1/2005 |
| WO | 2006/048207 | 5/2006 |

OTHER PUBLICATIONS

D. Chase, "Code Combining-A Maximum-Likelihood Decoding Approach for Combining an Arbitrary No. of Noisy Packets," IEEE Transactions on Communications, vol. comm. 33, No. 5, May 1985, pp. 385-393.

3GPP TR 25.814 V1.2.2 (Mar. 2006), Technical Report, "3$^{rd}$ Generation Partnership Project; Technical Specification Group Radio Access Network; Physical Layer Aspects for Evolved UTRA (Release 7)," Mar. 2006, pp. 1-104.

3GPP TS 25.212 V7.0.0 (Mar. 2006), Technical Specification "3$^{rd}$ Generation Partnership Project; Technical Specification Group Radio Access Network; Multiplexing and channel coding (FDD) (Release 7)," Mar. 2006, pp. 1-84.

3GPP TSG RAN WG1 Meeting #47, R1-063326 "ACK/NACK Signal Structure in E-UTRA Downlink," Riga, Latvia, Nov. 2006, pp. 1-3.

European Office Action dated Oct. 15, 2010.

Japanese Office Action dated Jun. 5, 2012 with English translation.

3GPP TSG RAN WG1 Meeting #47, "ACK/NACK Signal Structure in E-UTRA Downlink," NTT DoCoMo, et al., R1-063326, Nov. 6-10, 2006, pp. 1-3.

European Office Action dated Feb. 27, 2013.

* cited by examiner

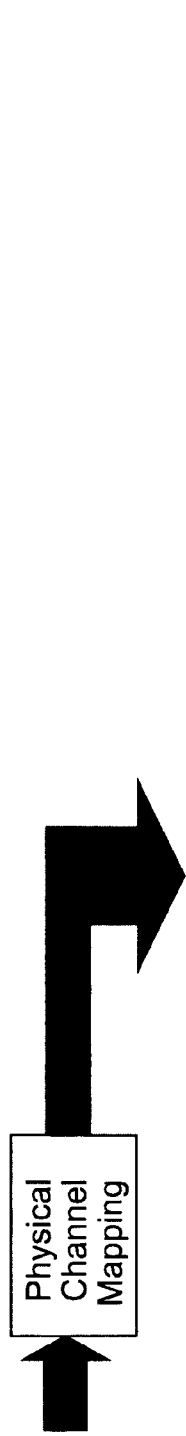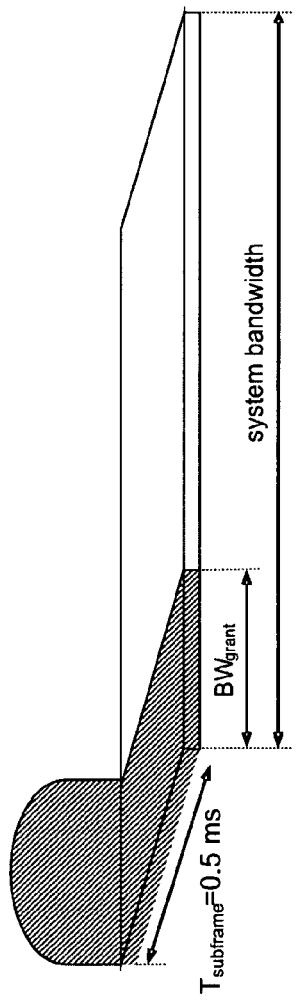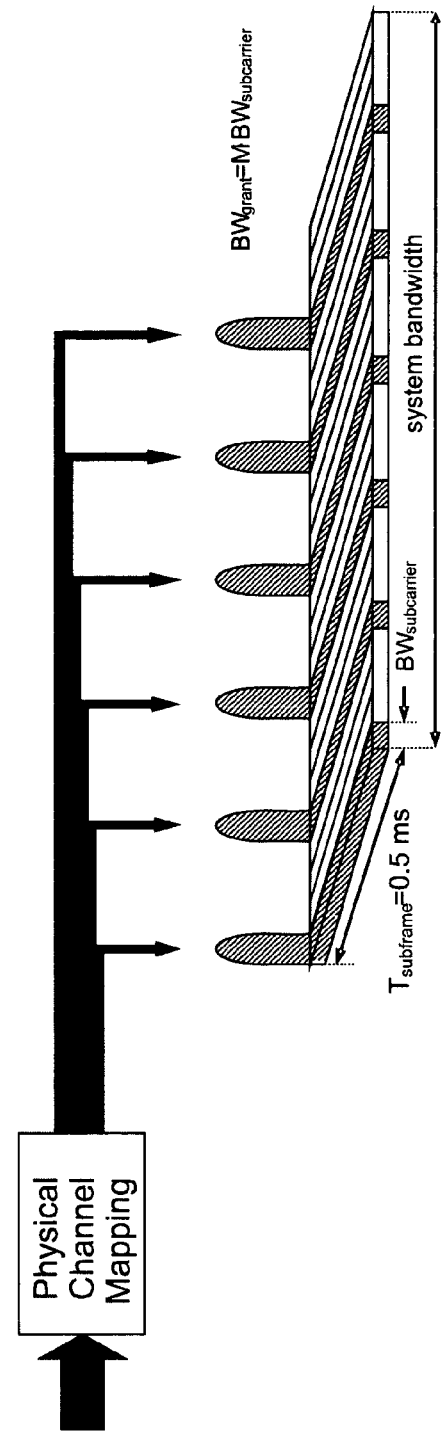

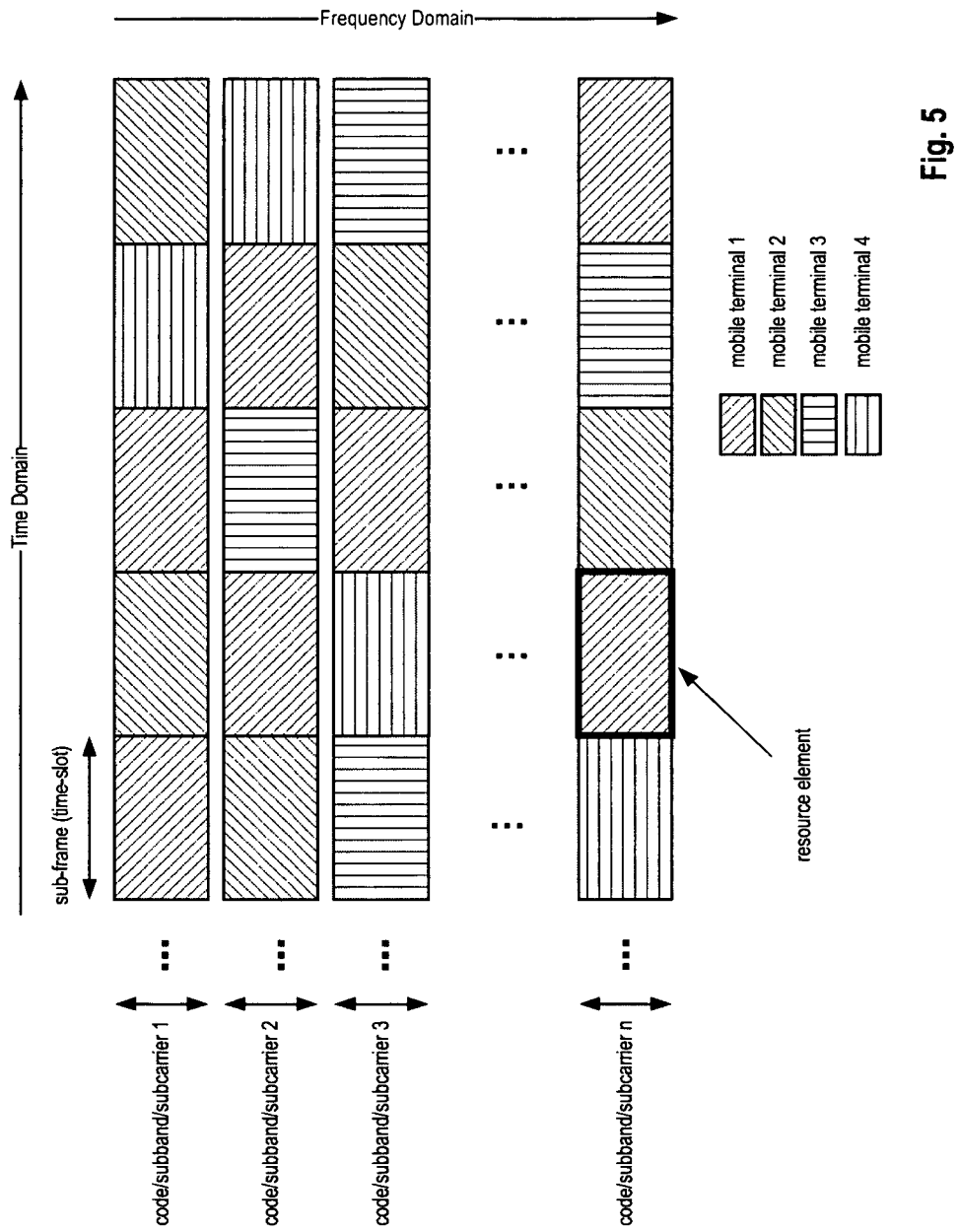

AVOIDANCE OF FEEDBACK COLLISION IN MOBILE COMMUNICATIONS

FIELD OF THE INVENTION

The invention relates to feedback transmission for data packets in a mobile communication system. In particular the invention provides a communication system wherein feedback information of a retransmission protocol for transmitted data packets is transmitted. Further, the invention relates to a method for determining radio resources for the transmission of feedback information of a retransmission protocol for transmitted data packets as well as to a base station and a mobile station performing the method.

TECHNICAL BACKGROUND

In modern communication systems implementing error detection mechanisms in combination with feedback signaling features so as to positively and/or negatively acknowledge successful and/or unsuccessful reception of data by the receiving entity, respectively, a communication channel between data receiving entity and data transmission entity has to be available to transmit these acknowledgement signals. Typically, a positive acknowledgement is referred to as an "ACK", while the negative acknowledgement is referred to as "NAK" or "NACK". The transmission of acknowledgments is typically handled by so-called retransmission protocols which not only implement the feedback signaling, but also data retransmission in response to the feedback signals.

The most common technique for error detection of non-real time services is based on Automatic Repeat reQuest (ARQ) schemes, which may be combined with Forward Error Correction (FEC), called Hybrid ARQ (abbreviated HARQ). If Cyclic Redundancy Check (CRC) detects an error, the receiver requests the transmitter to send additional bits or a new data packet by sending an NACK or ACK message, respectively. From different existing schemes the stop-and-wait (SAW) and selective-repeat (SR) ARQ are most often used in mobile communication.

In modern digital communication systems, the data units or data packets to be sent may be encoded before transmission. Depending on the bits that are retransmitted three different types of ARQ may be defined.

In HARQ Type I the erroneous data packets received, also called PDUs (Packet Data Unit) are discarded and new copy of that PDU is retransmitted and decoded separately. There is no combining of earlier and later versions of that PDU. Using HARQ Type II the erroneous PDU that needs to be retransmitted is not discarded, but is combined with some incremental redundancy bits provided by the transmitter for subsequent decoding. Retransmitted PDU sometimes have higher coding rates and are combined at the receiver with the stored values. That means that only little redundancy is added in each retransmission.

Finally, HARQ Type III is almost the same packet retransmission scheme as Type II and only differs in that every retransmitted PDU is self-decodable. This implies that the PDU is decodable without the combination with previous PDUs. In case some PDUs are so heavily damaged that almost no information is reusable, self-decodable packets can be advantageously sent.

When employing chase-combining the retransmission packets carry identical symbols. In this case the multiple received packets are combined either by a symbol-by-symbol or by a bit-by-bit basis (see D. Chase: "Code combining: A maximum-likelihood decoding approach for combining an arbitrary number of noisy packets", IEEE Transactions on Communications, Col. COM-33, pages 385 to 393, May 1985). These combined values are stored in the soft buffers of respective HARQ processes.

HARQ in 3G Systems

In the context of third generation communication systems like UMTS, a HARQ protocol is for example used for High-Speed Downlink Packet Access (HSDPA) as well as High-Speed Packet Uplink Packet Access (HSUPA).

In the following the HARQ protocol for HSUPA is described in more detail. Node B controlled Hybrid ARQ allows for rapid retransmissions of erroneously received data packets on the E-DPDCH (Enhanced Dedicated Physical Data CHannel). The HARQ protocol is terminated at the UE on the terminal side and in the Node Bs at the UTRAN side of the UMTS network. Fast retransmissions between UE and Node B reduce the number of higher layer retransmissions, i.e. by RLC protocol, and the associated delays. Thus the quality perceived by the end user is improved.

A protocol structure with multiple stop-and-wait (SAW) hybrid ARQ processes is used for E-DCH (Enhanced Dedicated CHannel), similar to the scheme employed for the downlink HS-DSCH in HSDPA. An N-channel SAW scheme consists of N parallel HARQ processes, each process working as a stop-and-wait retransmission protocol. It is assumed that UE can only transmit data on a single HARQ process each transmission time interval (TTI).

In FIG. 1 an exemplary N-channel SAW protocol with N=3 HARQ processes is illustrated. UE is transmitting data packet #1 on E-DCH on the uplink to the Node B. The transmission is carried out on the first HARQ process. After propagation delay of the air interface $T_{prop}$ Node B receives the packet and starts demodulating and decoding. Depending on whether the decoding was successful feedback information in form of ACK or NACK is sent in the downlink (or forward link) to the UE on the E-HICH channel (Enhanced Harq acknowledgement Indicator CHannel). In this example the Node B sends an ACK after $T_{NBprocess}$, which denotes the time required for decoding and processing the received packet in Node B, to the UE. Based on the ACK/NACK feedback on the downlink the UE decides whether it resends the data packet or transmits a new data packet.

The processing time available for the UE between receiving the Acknowledgement and transmitting the next TTI in the same HARQ process is denoted $T_{UEprocess}$. In the example UE transmits data packet 4 upon receiving the ACK. The round trip time (RTT) denotes the time between transmission of a data packet in the uplink (or reverse link) and sending a retransmission of that packet or a new data packet upon receiving the ACK/NACK feedback for that packet. To avoid idle periods due to lack of available HARQ processes, it is necessary that the number N of HARQ processes matches to the HARQ round trip time (RTT).

Synchronous HARQ in HSUPA

In HSUPA a synchronous HARQ protocol is used, where retransmissions are sent at a predefined time instance. Essentially, a retransmission is sent a predefined time after a previously sent version of the same packet. The HARQ process number can be derived from the timing, i.e. CFN (Connection Frame Number). Employing a retransmission protocol with synchronous uplink transmissions Node B exactly knows when the retransmissions are sent by UE. Hence, the scheduler in the Node B can reserve the required uplink resources, which enables Node B a more precise control on the uplink interference in the cell.

For E-DCH it was also decided to send the HARQ feedback (ACK/NACK) in a synchronous manner, e.g. after a certain time instant upon having received the E-DCH data packet.

Redundancy Versions and Combining

The two fundamental forms of HARQ are Chase Combining and Incremental Redundancy (IR). In Chase combining, each retransmission repeats the first transmission or part of it. In IR, each retransmission provides new code bits from the mother code to build a lower rate code. While Chase combining is sufficient to make Adaptive Modulation and Coding (AMC) robust, incremental redundancy offers the potential for better performance with high initial and successive code rates, at higher signal-to-noise (SNR) estimation error and forward error correction (FER) operating points (i.e., a greater probability that a transmission beyond the first will be needed), albeit at the cost of additional memory and decoding complexity.

A systematic turbo encoded data packet (e.g. E-DCH data packet) contains the original information bits (systematic bits) and additional parity bits (redundancy). The letter S typically denotes the systematic bits, while the letter P typically denotes the parity bits. In an incremental redundancy scheme there are typically self-decodable and non-self-decodable retransmissions. The usage of non-self decodable retransmissions provides the most gain with incremental redundancy. For E-DCH it was decided that there are 4 different redundancy versions for E-DCH, 2 self-decodable and 2 non-self decodable. The first transmission should always be self-decodable.

FIG. 2 shows an exemplary HARQ IR scheme for E-DCH. In the first transmission only systematic bits S are transmitted from the UE to the Node B. The first retransmission contains the first set of parity bits P1. The parity bits are added to the already received systematic bits in the Node B before decoding. In case the decoding fails, the Node B requests a further retransmission by means of a NACK. In the second retransmission the second set of parity bits P2 is transmitted to the Node B. The third retransmission contains the systematic bits S and the first set of parity bits P1. In the given example the initial transmission and the second retransmission are self-decodable, the first and third retransmissions are non-self decodable.

Long Term Evolution (LTE)

Third-generation mobile systems (3G) based on Wideband Code Division Multiple Access (WCDMA) technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

However, knowing that user and operator requirements and expectations will continue to evolve, the 3GPP has begun considering the next major step or evolution of the 3G standard to ensure the long-term competitiveness of 3G. The 3GPP recently launched a Study Item "Evolved UTRA and UTRAN". The study will investigate means of achieving major leaps in performance in order to improve service provisioning and reduce user and operator costs. It is generally assumed that there will be a convergence toward the use of Internet Protocols (IP), and all future services will be carried on top of IP. Therefore, the focus of the evolution is on enhancements to the packet-switched (PS) domain.

The main objectives of the evolution are to further improve service provisioning and reduce user and operator costs as already mentioned. More specifically, some key performance and capability targets for the long-term evolution are Significantly higher data rates compared to HSDPA and HSUPA: envisioned target peak data rates of more than 100 Mbps over the downlink and 50 Mbps over the uplink Improved coverage: high data rates with wide-area coverage Significantly reduced latency in the user plane in the interest of improving the performance of higher layer protocols (for example, TCP) as well as reducing the delay associated with control plane procedures (for instance, session setup); and Greater system capacity: threefold capacity compared to current standards.

One other key requirement of the long-term evolution is to allow for a smooth migration to these technologies.

Uplink Access Scheme for LTE

For uplink transmission, power-efficient user-terminal transmission is necessary to maximize coverage. Single-carrier transmission combined with FDMA and dynamic bandwidth allocation has been chosen as the evolved UTRA uplink transmission scheme. The main reason for the preference for single-carrier transmission is the lower peak-to-average power ratio (PAPR) compared to multi-carrier signals (such as OFDMA), the corresponding improved power-amplifier efficiency and assumed improved coverage (higher data rates for a given terminal peak power). In each time interval, Node B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one transmission time interval, e.g. a sub-frame of 0.5 or 1.0 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

The frequency resource can either be in a localized or distributed spectrum as illustrated in FIG. 3 and FIG. 4. As can be seen in FIG. 3, localized single-carrier is characterized by the transmitted signal having a continuous spectrum that occupies a part of the total available spectrum. Different symbol rates (corresponding to different data rates) of the transmitted signal imply different bandwidths of a localized single-carrier signal.

On the other hand, as can be seen in FIG. 4, distributed single-carrier is characterized by the transmitted signal having a non-continuous ("comb-shaped") spectrum that is distributed over system bandwidth. Note that, although the distributed single-carrier signal is distributed over the system bandwidth, the total amount of occupied spectrum is, in essence, the same as that of localized single-carrier. Furthermore, for higher/lower symbol rate, the number of "comb-fingers" is increased/reduced, while the "bandwidth" of each "comb finger" remains the same.

The distributed mode may be implemented in different ways:
- A user (codeblock) is allocated on multiple distributed resource blocks
- A user (codeblock) is allocated on multiple distributed subcarriers or modulation symbols belonging to resource blocks, where the resource blocks are shared by multiple distributed mode users.
- A user (codeblock) is allocated on multiple distributed subcarriers or modulation symbols, which are punctured into a resource block used also for localized mode.

The transmission in distributed mode is generally used to obtain frequency diversity (in contrast to multi-user diversity for localized mode) and, hence, may be useful in the following cases:
- The channel quality to the mobile stations (receivers) of the resource blocks is not known sufficiently well at the base station (transmitter), e.g. due to limited or poor CQI (Channel Quality Indicator) feedback and/or due to outdated CQI feedback (e.g. due to high Doppler frequency).
- The data to be transmitted is delay critical and the transmission should be made robust At first glance, the spectrum shown in FIG. 4 may give the impression of a multi-carrier signal where each comb-finger corresponds to a "sub-carrier". However, from the time-domain signal-generation of a distributed single-carrier signal, it should be clear that what is being generated is a true single-carrier signal with a corresponding low peak-to-average power ratio.

The key difference between a distributed single-carrier signal vs. a multi-carrier signal, such as e.g. OFDM, is that, in the former case, each "sub-carrier" or "comb finger" does not carry a single modulation symbol. Instead each "comb-finger" carries information about all modulation symbol. This creates a dependency between the different comb-fingers that leads to the low-PAPR characteristics. It is the same dependency between the "comb fingers" that leads to a need for equalization unless the channel is frequency-non-selective over the entire transmission bandwidth. In contrast, for OFDM equalization is not needed as long as the channel is frequency-non-selective over the sub-carrier bandwidth.

Distributed transmission can provide a larger frequency diversity gain than localized transmission, while localized transmission more easily allows for channel-dependent scheduling. Note that, in many cases the scheduling decision may decide to give the whole bandwidth to a single UE to achieve high data rates.

It should be noted, that multiplexing of localized mode and distributed mode within a sub-frame is possible, where the amount of resources (RBs) allocated to localized mode and distributed mode may be fixed, semi-static (constant for tens/hundreds of sub-frames) or even dynamic (different from sub-frame to sub-frame).

In localized mode as well as in distributed mode in—a given sub-frame—one or multiple data blocks (which are inter alia referred to as transport-blocks) may be allocated separately to the same user (mobile station) on different resource blocks, which may or may not belong to the same service or Automatic Repeat reQuest (ARQ) process. Logically, this can be understood as allocating different users.

Uplink Scheduling Scheme

The uplink scheme should allow for scheduled (Node B controlled) access.

In case of scheduled access the UE is dynamically allocated a certain frequency resource for a certain time (i.e. a time/frequency resource) for uplink data transmission. More specifically the scheduler determines
- which UE(s) that is (are) allowed to transmit,
- which physical channel resources (frequency, subband, sub-carrier, resource block),
- for how long the resources may be used (number of sub-frames, number of TTIs)
- Transport format (Modulation Coding Scheme (MCS)+transport block size) to be used by the mobile terminal for transmission The allocation information is signaled to the UE via a scheduling grant, sent on the downlink control channel. For simplicity reasons this channel is called Grant Channel in the following. A scheduling grant message contains at least information on which part of the frequency band the UE is allowed to use, whether localized or distributed spectrum should be used, the validity period of the grant, and the maximum data rate. The shortest validity period is one sub-frame. Additional information may also be included in the grant message, depending on the selected scheme.

Uplink data transmissions are only allowed to use the time-frequency resources assigned to the UE through the scheduling grant. The transmission of new data can only occur with a scheduling grant. Unlike in HSUPA, where each UE is always allocated a dedicated channel there is only one uplink data channel shared by multiple users (UL SCH) for data transmissions. Furthermore, there is only one mode of operation for the uplink data access in LTE, the above described scheduled access, i.e. unlike in HSUPA where both scheduled and autonomous transmissions are possible.

To request resources, the UE transmits a resource request message to the Node B. This resources request message could for example contain information on the amount of data to transmit, the power status of the UE and some Quality of Services (QoS) related information. This information, which will be referred to as scheduling information, allows Node B to make an appropriate resource allocation. In a multiple access or shared data channel communication system there may co-exist several resources at the same time which may be granted independently to several users or services. Therefore there may exist also multiple grants in the same time slot. Such grants are preferably transmitted using a shared or dedicated control channel, for simplicity called "Grant Channel". Consequently there may also exist multiple ACK/NACK signals or channels that are to be transmitted within the same time slot.

Downlink Access Scheme for LTE

FIG. 5 shows a packet-scheduling system on a shared downlink channel for systems with a single shared data channel. A time slot (also referred to as a subframe or PHY Frame herein) reflects the smallest interval at which the scheduler (e.g. the Physical Layer or MAC Layer Scheduler) performs the dynamic resource allocation (DRA). Further, typically the smallest unit of radio resources (referred to as a resource block herein), which can be allocated in OFDM systems, is defined by one time slot in time domain and by one subcarrier/subband/resource block in the frequency domain. Similarly, in a CDMA system this smallest unit of radio resources is defined by a time slot in the time domain and a code in the code domain. In OFCDMA or MC-CDMA systems, this smallest unit is defined by one time slot in time domain, by one subcarrier/subband/resource block in the frequency domain and one code in the code domain. Note that dynamic resource allocation may be performed in time domain and in code/frequency domain.

The main benefits of packet-scheduling are the multi-user diversity gain by time domain scheduling (TDS) and dynamic user rate adaption.

Assuming that the channel conditions of the users change over time due to fast (and slow) fading, at a given time instant the scheduler can assign available resources (codes in case of CDMA, subcarriers/subbands in case of OFDMA) to users having good channel conditions in time domain scheduling. For explanatory reasons, the following sections will mainly concentrate on OFDMA downlink transmission.

Specifics of DRA and Shared Downlink Channel Transmission in OFDMA

Additionally to exploiting multi-user diversity in time domain by TDS, in OFDMA multi-user diversity can also be exploited in frequency domain by FDS (Frequency Domain Scheduling). This is because the OFDM signal is in frequency domain constructed out of multiple narrowband subcarriers (typically grouped into subbands), which can be assigned dynamically to different users. By this, the frequency selective channel properties due to multi-path propagation can be exploited to schedule users on frequencies (subcarriers/subbands/resource blocks) on which they have a good channel quality (multi-user diversity in frequency domain).

For practical reasons in an OFDMA system the bandwidth is divided into multiple subbands or resource blocks, which consist out of multiple subcarriers. I.e. the smallest unit on which a user may be allocated would have a bandwidth of one subband and a duration of one time slot (which may correspond to multiple OFDM symbols), which is denoted as a RE (Resource Element). Typically a subband consists of consecutive subcarriers, however in some case it is desired to form a subband out of distributed non-consecutive subcarriers. A scheduler may also allocate a user over multiple consecutive or non-consecutive subbands and/or time slots.

E.g. for the 3GPP Long Term Evolution (see 3GPP TR 25.814: "Physical Layer Aspects for Evolved UTRA", Release 7, v. 1.2.2, March 2006—available at http://www.3gpp.org), a 10 MHz system may consist out of 600 subcarriers with a subcarrier spacing of 15 kHz, which may then be grouped into 50 subbands (a 12 subcarriers) with each subband or resource block occupying a bandwidth of 180 kHz. Assuming, that a time slot has a duration of 1.0 ms, then a resource element would span over 180 kHz and 1.0 ms.

In order to exploit multi-user diversity and to achieve scheduling gain in frequency domain, the data for a given user should be allocated on resource elements on which the users have a good channel condition. Typically, those resource elements are close to each other and therefore, this transmission mode is in also denoted as localized mode (LM). An example for a localized mode channel structure has been discussed with respect to FIG. 3 above. In this example neighboring resource elements are assigned to four mobile stations (MS1 to MS4) in the time domain and frequency domain. For exemplary purposes it is also assumed that in the "gaps" between the different resource elements in the time domain, Layer 1 and/or Layer 2 control signaling is transmitted.

In localized mode as well as in distributed mode in a given time slot multiple codeblocks (which are referred to as transport-blocks in 3GPP terminology) may be allocated separately to the same user on different resource elements, which may or may not belong to the same service or ARQ process. Logically, this can be understood as allocating different users.

Shared Channel Related Control Signaling

In order to inform the scheduled users about their allocation status, transmission format and data related parameters Layer 1 and Layer 2 control signaling is typically transmitted along with one or multiple shared data channels (SDCHs).

In 3GPP HSDPA (CDMA) the Layer 1/Layer 2 control signaling is transmitted on multiple shared control channels (SCCHs) on a transmission time interval (TTI)-basis (a TTI may thereby correspond to a time slot in its length). Each transmitted shared control channel carries for example information for one scheduled user, such as channelization-code-set, modulation scheme, transport-block size information, redundancy and constellation version, HARQ process information, new data indicator (similar to a HARQ sequence number) and user identity (see e.g. 3GPP TS 25.212: "Multiplexing and channel coding (FDD)", Release 7, v. 7.0.0, March 2006, available at http://www.3gpp.org).

Generally, the information sent via Layer 1/Layer 2 control signaling may be separated into two categories, shared control information (SCI) and dedicated control information (DCI). The shared control information part of the Layer 1/Layer 2 control signaling contains information related to the resource allocation and it should therefore be possible for all users to decode the shared control information. It typically contains the following information:

User identity
RE allocation information

Depending on the setup of other channels and the setup of the dedicated control information, the shared control information may additionally contain information such as ACK/NACK for uplink transmission, MIMO related information, uplink scheduling information, information on the dedicated control information (resource, MCS, etc.).

The dedicated control information part of the Layer 1/Layer 2 control signaling contains information related to the transmission format and to the transmitted data to a specific scheduled user. I.e. the dedicated control information needs only to be decoded by the scheduled user. The dedicated control information typically contains information on the transmission format:

Modulation scheme
Transport-block size (or coding rate)

Depending on the overall channel configuration, depending on the shared control information format and depending on the HARQ setup it may additionally contain information such as HARQ related information (e.g. HARQ process information, redundancy and constellation version, new data indicator), MIMO related information.

Layer 1/Layer 2 control signaling may be transmitted in various formats. One option is joint encoding of shared control information and dedicated control information. Thereby, shared control information and dedicated control information for multiple users (codeblocks) are encoded jointly or the shared control information and dedicated control information are encoded jointly for a single user (codeblock) and are transmitted separately per user (codeblock).

Another option is the separate encoding of shared control information and dedicated control information. Thereby, the shared control information for multiple users (codeblocks) are encoded jointly or the shared control information is encoded per user (codeblocks). Similarly, the dedicated control information for multiple users (codeblocks) is encoded jointly or the dedicated control information is encoded per user (codeblocks).

In case of having multiple shared control information codeblocks (each shared control information codeblock may contain shared control information for multiple users), the shared control information codeblocks may be transmitted with different power, modulation, coding schemes and/or code rates.

From a logical point of view, the Layer 1/Layer 2 control signaling contained out of shared control information and dedicated control information may be seen e.g. as follows:

A single (shared) control channel with two parts (shared control information and dedicated control information)

A single (shared) control channel (carrying only shared control information), where the dedicated control information is not considered a separate control channel, but part of the shared data channel, i.e. mapped together with the data (same RE)

Two separate control channels (shared control information, dedicated control information)

Multiple separate control channels, e.g.:

Single shared control channel carrying shared control information and multiple dedicated control channels carrying dedicated control information Multiple shared control channels carrying shared control information and multiple dedicated control channels carrying dedicated control information Multiple shared control channels carrying shared control information, where the dedicated control information is not a separate control channel, but part of the shared data channel, i.e. mapped together with the data (same RE)

Typically, both the shared control information and the dedicated control information is mapped separately from the shared data channel into the physical resources, which may also be called shared control channel. Alternatively, the dedicated control information may be mapped into the resources allocated for the shared data channel, such that a part of individual shared resource elements is reserved for dedicated control information.

Link Adaptation (LA) Techniques

In order to efficiently utilize the benefits from scheduling in uplink and downlink, respectively, usually it is combined with fast LA (Link Adaptation) techniques such as AMC (Adaptive Modulation and Coding) and ARQ (Automatic Repeat reQuest). Additionally, fast and/or slow power control may be applied.

Employing adaptive modulation and coding (AMC), the data-rate per codeblock (in case a codeblock spans over multiple resource elements, the AMC may alternatively be performed per resource elements) for a scheduled user is adapted dynamically to the instantaneous channel quality of the respective allocated resource by changing the MCS (Modulation and Coding Scheme). Naturally, this requires a channel quality estimate at the transmitter for the link to the respective receiver.

Identification of the Entity to Receive ACK/NACK Signaling

In order to positively identify which ACK/NACK signal corresponds to which data packet, one possibility is to attach an identifier to the ACK/NACK. The identifier is preferably a User Equipment Identifier (UE-ID) or a Group Identifier (G-ID). Since data packets are usually transmitted to a single UE or group of UEs, the UE-ID or G-ID may be used to unambiguously define the target UEs and therefore the corresponding data packet.

However, the attachment of an identifier like a UE-ID or G-ID to the ACK/NACK message is potentially inefficient, because a single ACK/NACK signal commonly consists of only one bit, while an identifier may contain up to 16 bits or more, depending on the communication system. Therefore it is desirable to save as much of this overhead as possible in order to increase the spectral efficiency.

In 3GPP TSG RAN WG1 Tdoc R1-063326 "ACK/NACK Signal Structure in E-UTRA Downlink" by NTT DoCoMo, Fujitsu, Mitsubishi Electric, NEC, Sharp and Toshiba Corporation (submitted for a meeting in Riga, Latvia, Nov. 6 to 10, 2006, available at http://www.3gpp.org and incorporated herein by reference), it is proposed to link the index of the ACK/NACK channel to the index of the L1/L2 control channel. A flow chart illustrating the proposed scheme is illustrated in FIG. 6.

Those skilled in the art will realize that said L1/L2 control channel is an instance of said grant channel. This obviates the transmission of an additional identifier for the ACK/NACK message. Assuming the grant is transmitted on grant channel #x, then the ACK/NACK message corresponding to the data transmission granted by grant channel #x is transmitted using ACK/NACK resource #x. Generally the ACK/NACK resource may be one of a frequency, time, code, or antenna resource. In an abstract way it may be seen as an information field, e.g. a bit field, contained within a generalized control signal structure. In the context of OFDM or other multi-carrier communication systems the division in frequency domain may be expressed as a sub-carrier. According to TDoc R1-063326, the UE ID-less transmission is based on the one-to-one relationship between the index of the downlink L1/L2 control channel for uplink radio resource assignment and the index of ACK/NACK radio resources (e.g. index of sub-carrier sets for Frequency Division Multiplex (FDM) or code index for Code Division Multiplex (CDM)).

One potential drawback of the solution according to Tdoc R1-063326 may introduce ACK/NACK collisions. In a system where retransmissions of a packet are not scheduled, i.e. where no grant is transmitted for retransmissions, there is the possibility that a retransmission of a packet where the first transmission was granted on grant channel #x at time t occurs together with a new packet possibly pertaining to another user which is granted on grant channel #x at time $t+T_{rtt}$. According to Tdoc R06-3326, the ACK/NACK signal for those two packets (one new transmission and one retransmission) should both use ACK/NACK resource #x at time $t+2T_{rtt}$, causing a conflict which may introduce signaling errors, additional delay, or higher layer protocol violations. This potential drawback is illustrated for exemplary purposes in FIG. 7.

SUMMARY OF THE INVENTION

One object of the invention is to suggest a feedback signaling scheme that avoids collisions of feedback signaling.

The object is solved by the subject matter of the independent claims. Advantageous embodiments are subject to the dependent claims.

One aspect of the invention relates to a new feedback signaling scheme, in particular to a scheme for determining a resource for feedback signaling for data transmissions (e.g. data packets). As will be described in further detail below, the invention may provide the advantage that it does not require the inclusion of individual terminal or group identifiers so as to identify the receiver(s) of the feedback signaling while avoiding collisions in feedback signaling. Generally the invention assumes a communication system wherein feedback information for transmitted data packets is to be transmitted, e.g. as part of a retransmission protocol. The invention suggests the use of a new parameter, namely the current transmission number of a data packet for identifying a radio resource (on a feedback channel) for sending feedback for the data packet.

According to an aspect of the invention an association or correspondence between resources for transmitting scheduling related information and resources used for feedback signaling is assumed additionally. As a consequence thereof, the resources used for sending scheduling related information for a first transmission of a data packet may be one parameter for indicating a radio resource for transmitting feedback information for a data packet (e.g. to which the scheduling related information refers). In addition, the resource for the feedback information is not only determined according to a radio resource used for transmitting scheduling related information for a first transmission of a data packet but also taking into account a current transmission number of the data packet. In one embodiment, the current transmission number of the data packet refers to the number of transmissions that have taken place for the data packet, i.e. a packet transmission counter value.

Similar, according to another aspect, no correspondence between resources for transmitting scheduling related information and resources used for feedback signaling is assumed. Instead, there may be a correspondence between resources for transmitting data packets (as for example specified in scheduling information) and resources used for feedback signaling. Accordingly, in another embodiment of the invention, the resources used for sending a first transmission of a data packet may be one parameter for indicating a radio resource for transmitting feedback information for a data packet (e.g. to which the scheduling related information refers) that may be additionally considered in determining the resource for the feedback information.

According to another aspect of the invention, signaling related to the transmission of a data packet may be used for determining at least one out of plural parameters specifying the radio resource for the feedback information, while the remaining parameter(s) for uniquely identifying the feedback radio resource may be derived from the current transmission number of the data packet. For example, the signaling may indicate a code of the feedback channel in the code domain while the current transmission number indicated the location of the resource block on the feedback channel in the time domain. Another example may be that the signaling indicates the position of the feedback in the time domain, while the current transmission counter of the data packet determines the frequency resource (e.g. subband, subcarrier(s), frequency range, etc.) in the frequency domain and/or a channelization code in the code domain. The signaling may for example be included in the scheduling information for a data packet.

Further, it should be noted that in case of utilizing retransmission protocols like HARQ with soft-combining functions, the feedback information (e.g. ACK or NACK) may be sent depending on the decoding status of the data packet.

This basic feedback scheme according to the invention may be advantageously used with synchronous retransmission schemes. In one embodiment of the invention, a synchronous retransmission scheme is employed where the retransmissions for a data packet are not scheduled, i.e. the sender of the data packet will "autonomously" send a retransmission for the data packet, e.g. upon reception of a NACK signal.

Furthermore, the invention may be advantageously used for uplink and/or downlink transmissions. When utilizing the invention for downlink transmissions, the scheduling related information may be a resource indication (e.g. terminal or group identifier, resource assignment and duration of the assignment) such as Layer 1/Layer 2 control signaling information. These resource indications may inform a targeted terminal(s) on the downlink resource(s) which are allocated or reserved for a particular terminal or group of terminals on which the terminal(s) are supposed to receive data. When utilizing the invention for uplink transmissions the scheduling related information may for example correspond to scheduling assignments or scheduling grants. These assignments or grants typically allocate an uplink resource to one or more terminals, on which the terminal(s) is supposed to send its uplink data.

One embodiment of the invention provides a mobile communication system, wherein feedback information of a retransmission protocol for transmitted data packets is transmitted and wherein a radio resource for transmitting feedback information for a data packet is determined according to a current transmission number of the data packet. The current transmission number (or counter) may for example indicate the number of transmissions that have taken place for the respective data packet according to another embodiment of the invention.

In a further embodiment, the radio resource for transmitting feedback information for a data packet is determined according to a radio resource used for transmitting scheduling information for a first transmission of the data packet and the current transmission number of the data packet. For example, the radio resource used for transmitting scheduling information is derived from an index choosing from a plurality of scheduling related control channels.

Alternatively, in another embodiment of the invention, the radio resource for transmitting feedback information for a data packet is determined according to a radio resource used for transmitting the first transmission of a data packet and the current transmission number of the data packet.

In some embodiments of the invention the scheduling information is a scheduling grant allocating an uplink resource to a mobile terminal for transmitting a data packet on the uplink. This embodiment may be especially applicable to scheduled uplink data transmissions of mobile terminals. In an alternative embodiment, the scheduling information indicates a mobile terminal a downlink resource on which a data packet is transmitted to the mobile terminal. This scenario may be especially applicable to downlink data transmissions by a base station.

According to another embodiment, the mobile communication system comprises a receiving entity for receiving the feedback information for a data packet, wherein the receiving entity is adapted to select at least one of a code, MIMO layer, a reception timing and a frequency range for the reception of feedback information according to the channel index of a scheduling related channel and a current transmission number of the data packet for which the feedback information is sent.

In a further embodiment, the mobile communication system comprises a transmitting entity for transmitting the feedback information for a data packet, wherein the transmitting entity is adapted to select at least one of a code, MIMO layer, a reception timing and a frequency range for the transmission of the feedback information according to the channel index of a scheduling related channel and a current transmission number of the data packet for which the feedback information is sent.

Another embodiment of the invention suggests the use of synchronous retransmissions of a data packet by a retransmission protocol. Alternatively or in addition thereto, the retransmission protocol retransmissions of a data packet are sent without prior transmission of scheduling information for a retransmission. Thus, in some embodiments of the invention the retransmission are not scheduled.

The mobile communication system according to one of claims 1 to 11, wherein in the retransmission protocol retransmissions of a data packet are sent after a preconfigured or fixed time span upon having received feedback information for a previous transmission of the data packet, upon having received a previous transmission of the data packet, or upon having received the scheduling information for the data packet.

In other exemplary embodiments of the invention, there may exist a predetermined relation between the transmission resource of a scheduling information on a scheduling related channel and at least one of a code, a reception timing and a frequency range for the transmission of the feedback information known to the transmitting entity sending the feedback information and a receiving entity receiving the feedback information Further, according to another embodiment, the scheduling information and the feedback information are multiplexed to the same control channel.

In another embodiment, the radio resource for transmitting feedback information for a data packet is determined according to a radio resource used for transmitting scheduling information for a first transmission of the data packet, and a current transmission number of the data packet and/or a redundancy version utilized for transmitting the data packet.

According to a further embodiment of the invention, radio resources for the transmission of the feedback information for a data packet are reserved in the communication system. The number of reserved radio resources may thereby depend on the maximum number of transmission for a packet allowed by the retransmission protocol.

In other embodiments, radio resources for the transmission of the feedback information for a data packet are reserved in the communication system Thereby, the number of reserved radio resources may for example depend on the number of redundancy versions used for transmitting the data packet. In one example, the number of redundancy versions is smaller than the maximum number of transmissions for a data packet in the retransmission protocol.

According to another embodiment of the invention, the number of radio resources reserved in the communication system for the transmission of the feedback information for a data packet is chosen so that a corresponding number of transmissions for a data packet yields a probability for successfully decoding the data packet above a fixed or configurable threshold value.

In a further embodiment, it is assumed that there is a number of $N_{fr}$ feedback resources reserved for feedback transmission in the communication system each being associated to a feedback resource index. Moreover, each feedback resource for providing feedback for a data packet may be chosen based on the equation $$\text{feedback resource index} = (\text{current transmission number}) \bmod N_{fr}.$$

Another embodiment of the invention relates to a method for determining radio resources for the transmission of feedback information of a retransmission protocol for transmitted data packets. This method may comprise the step of determining by a feedback transmission entity a radio resource for transmitting feedback information for a data packet according to a radio resource used for transmitting scheduling information for a first transmission of the data packet and a current transmission number of the data packet.

In a further embodiment, the feedback information may be transmitted to a data packet transmission entity transmitting the data packet on the determined radio resource. Moreover, in another embodiment, the scheduling information is transmitted to the data packet transmission entity or the feedback transmission entity.

Accordingly, in a further embodiment, the feedback transmitting entity may received a data packet being associated a current transmission number indicating the number of transmission that have taken place for the data packet.

In a further embodiment, the feedback transmission entity may determine whether the current transmission number of the data packet exceeds a threshold counter value, and if so, the feedback transmission entity transmits the feedback information for the data packet on the radio resource corresponding to the radio resource utilized for transmitting the feedback information for the first transmission of the data packet. Further, no transmissions requiring the use of the radio resource utilized for transmitting the feedback information for the first transmission of the data packet for feedback transmission are scheduled. In another exemplary embodiment of the invention, the threshold counter value is the number of redundancy versions utilized for transmitting the data packet. The number of redundancy versions may be for example lower than the maximum number of transmissions configured for the transmission of the data packet.

In another embodiment of the invention the mobile communication system may switch to a signaling mode in which retransmissions for a data packet are scheduled, if the current transmission number of the data packet exceeds a threshold counter value.

According to a further embodiment, it may be switched to a signaling mode for feedback provision in which the feedback signal comprises an identifier of the transmitting entity sending the data packet or a scheduling related channel and an indication of the current transmission number, if the current transmission number of the data packet exceeds a threshold counter value. In one further embodiment, this identifier is derived from an index choosing from a plurality of scheduling related control channels.

In another embodiment of the invention the received packet data is a retransmission of the data packet. This retransmission may be not scheduled.

A further embodiment of the invention provides a base station in a mobile communication system for providing feedback information for uplink transmissions of data packets by a mobile terminal. The base station may comprise a transmitter for transmitting a scheduling grant to the mobile terminal allocating radio resources for the transmission of uplink data, and a receiver for receiving a packet data unit of a data packet and a current transmission number of the data packet from the mobile terminal. Further, the base station may include a processing unit for determining a radio resource based on the current transmission number of the data packet. The transmitter may be configured to transmit feedback information indicating a successful or unsuccessful decoding of the data packet to the mobile terminal on the determined radio resource.

Another embodiment of the invention relates to a base station in a mobile communication system for receiving feedback information for downlink transmissions of data packets to a mobile terminal. The base station may comprise a transmitter for transmitting a scheduling information indicating a radio resource to the mobile terminal on which a data packet is transmitted to the mobile terminal, and for transmitting a data packet to the mobile terminal, and a processing unit for determining a radio resource based on a radio resource used for transmitting the scheduling grant and the current transmission number of the data packet. Further, the base station may comprise a receiver for receiving from the mobile terminal feedback information indicating a successful or unsuccessful decoding of the data packet at the mobile terminal on the determined radio resource.

In another embodiment, the processing unit of a base station may be adapted to determine the radio resource based on a radio resource used for transmitting the scheduling grant and the current transmission number of the data packet.

A further embodiment of the invention provides a mobile terminal in a mobile communication system for receiving feedback information for uplink transmissions of data packets from a base station. This mobile terminal may comprise a receiver for receiving a scheduling grant to the mobile terminal allocating a radio resource for the transmission of uplink data, a transmitter for transmitting a data packet from the mobile terminal according to the scheduling grant, and a processing unit for determining a radio resource based on the current transmission number of the data packet. Moreover, the receiver may be configured to receive feedback information indicating a successful or unsuccessful decoding of the data packet at the base station on the determined radio resource.

Another embodiment related to a mobile terminal in a mobile communication system for transmitting feedback information for downlink transmissions of data packets to the mobile terminal. In this embodiment the mobile terminal may comprise a receiver for receiving scheduling information indicating a radio resource to the mobile terminal on which a data packet is transmitted to the mobile terminal, and for receiving a data packet from a base station, a processing unit for determining a radio resource based on a radio resource used for transmitting the scheduling grant, and a transmitter for transmitting to the base station feedback information indicating a successful or unsuccessful decoding of the data packet at the mobile terminal on the determined radio resource.

Further, according to another embodiment of the invention, the mobile terminal's processing unit is adapted to determine the radio resource based on a radio resource used for transmitting the scheduling grant.

BRIEF DESCRIPTION OF THE FIGURES

In the following the invention is described in more detail in reference to the attached figures and drawings. Similar or corresponding details in the figures are marked with the same reference numerals.

FIG. 3 shows an exemplary localized allocation of the uplink bandwidth in a single carrier FDMA scheme, FIG. 4 shows an exemplary distributed allocation of the uplink bandwidth in a single carrier FDMA scheme, FIG. 5 shows an exemplary packet-scheduling system on a shared downlink channel for systems with a single shared data channel.

DETAILED DESCRIPTION OF THE INVENTION

Figure 1:
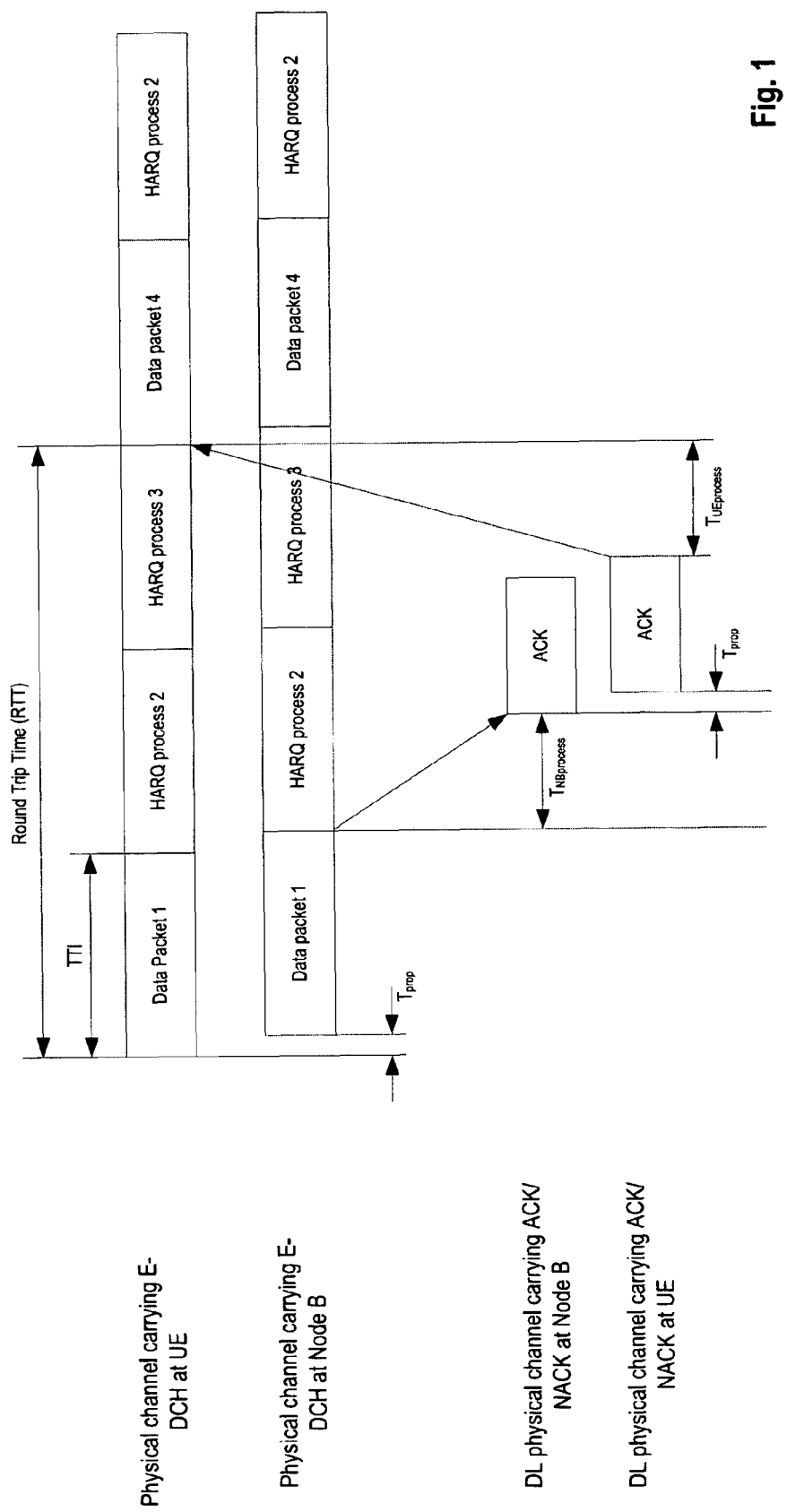
FIG. 1 shows an exemplary N-channel SAW protocol with N=3 HARQ processes.
Figure 2:
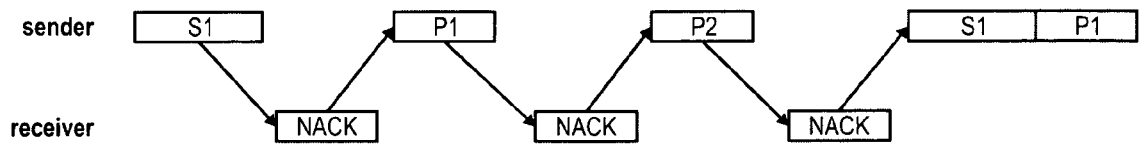
FIG. 2 shows an exemplary HARQ IR scheme for E-DCH.
Figure 6:
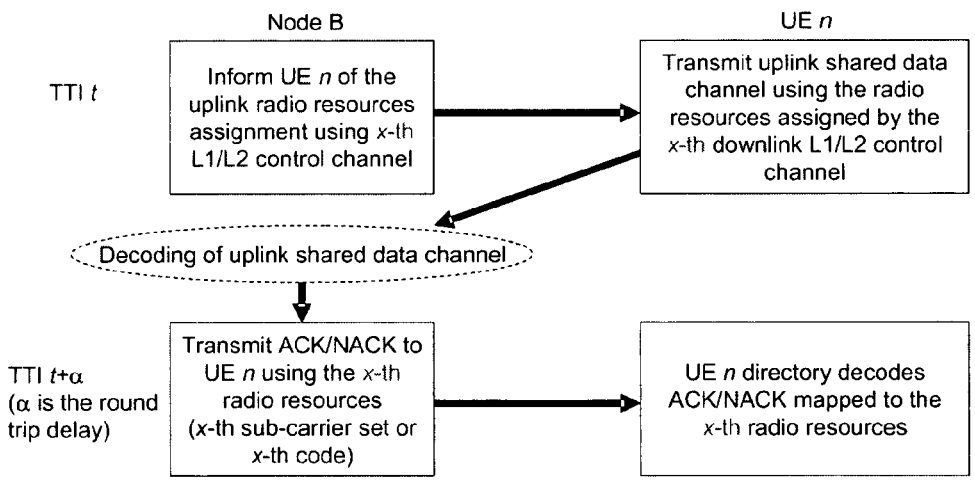
FIG. 6 shows a flow chart of a procedure linking the index of the ACK/NACK channel to the index of the L1/L2 control channel according to 3GPP TSG RAN WG1 Tdoc R1-063326 "ACK/NACK Signal Structure in E-UTRA Downlink"
Figure 7:
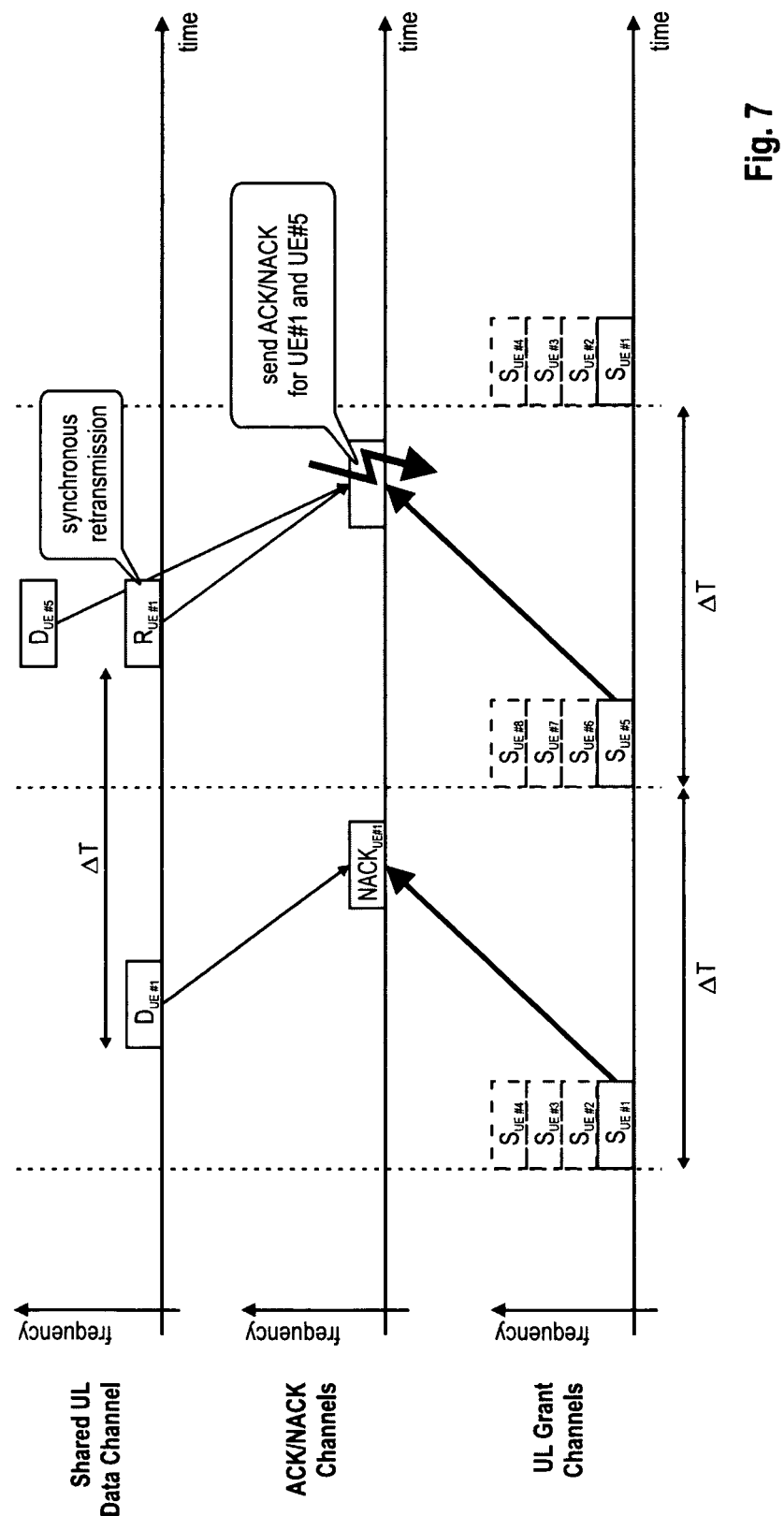
FIG. 7 illustrates a potential drawback of the procedure shown in FIG. 6.

The following paragraphs will describe various embodiments of the invention. For exemplary purposes only, most of the embodiments are outlined in relation to an (evolved) UMTS communication system according to the SAE/LTE discussed in the Technical Background section above. It should be noted that the invention may be advantageously used for example in connection with a mobile communication system such as the SAE/LTE communication system previously described, but the invention is not limited to its use in this particular exemplary communication network.

The explanations given in the Technical Background section above are intended to better understand the mostly SAE/LTE specific exemplary embodiments described herein and should not be understood as limiting the invention to the described configurations of the system or specific implementations of processes and functions in the mobile communication network. Nevertheless, the improvements proposed herein may be readily applied in the architectures/systems described in the Technological Background section and may in some embodiments of the invention also make use of standard and improved procedures of these architectures/systems.

One aspect of the invention is to propose a new feedback signaling scheme. In particular, a new scheme for mapping feedback information to a logical feedback channel is provided (note that "logical" does not necessarily refer to a "logical channel" as used in 3GPP-based systems, but intends to express the logical grouping of certain information, here feedback to a so-to-say virtual channel). According to one aspect of the invention, the at least one parameter of a feedback resource (e.g. ACK/NACK resource) is linked to a transmission counter (also referred to as transmission number herein) of a data packet.

In further embodiments of the invention, the feedback resource may be determined taking additionally into account (an index of) a scheduling related control channel and/or (an index of) the data channel on which the data packet is transmitted, and/or other signaling related to the feedback resource selection. This other signaling may for example be control information included in the scheduling information. A feedback resource may for example be defined by a combination of different parameters such as code, subcarrier block or frequency range, MIMO layer, transmission time (e.g. frame, subframe in frame, OFDM symbol of subframe), index or position within a bit-field or byte-field etc. Accordingly, the choice of at least one parameter defining the feedback resource depends on the (channel index of) a scheduling related channel and the transmission counter.

As indicated previously, the transmission counter may for example identify the current number of transmissions performed for a data packet. For example, for the initial transmission of a packet the counter may yield a value of 1, for the first retransmission a value of 2, . . . , and for the $n^{th}$ retransmission a value of n+1. The counter may also be referred to as packet transmission counter.

A scheduling related control channel may be for example assigned a channel index which identifies the channel or a channel resource thereof.

To potentially avoid collisions in the feedback signaling as well as the need to explicitly identify the destination for the feedback information by attaching an identifier, in one embodiment, a certain number of resources are reserved for the feedback signaling in the communication network. This number may generally be chosen freely, but may preferably inter alia depend on one or more of the following parameters of the communication system:

Number of scheduling related channels or number of scheduling related channel indexes Maximum number of transmissions configured for a data packet Number of available redundancy versions for transmitting a data packet Instead of employing only one single resource for feedback signaling relative to a respective scheduling related channel or channel index, $N_{reserved}$ resources are available for the feedback transmission. Which of the reserved resources is actually used for feedback transmission may for example be determined based on the transmission counter, as will be outlined in the following in more detail. Another additional parameter that may be further taken into account in this determination may be for example (a channel index of) an associated scheduling related channel or (a channel index of) an associated data channel on which a data packet for which the feedback is to be provided is sent.

In the following sections several embodiments of the invention will be outlined with respect to FIGS. 8 to 13. In these figures, $D_{UE\,\#i}$ or $D_{\#i}$ denotes a first transmission (typically the initial transmission) of a particular data packet by/to a transmitter (mobile terminal/UE) identified by number i. Similarly, $R_{UE\,\#i}$ or $R_{\#i}$ denotes a retransmission of the data packet by the transmitter identified by number i. In one exemplary embodiment, the data channel is an uplink shared channel. $NACK_{UE\,\#i}/NACK_{\#i}$ and $ACK_{UE\#i}/ACK_{\#i}$ respectively denote negative and positive acknowledgements for a packet of/for transmitter with number i for which a transmission has been received by the receiver sending the feedback. $S_{UE\,\#i}$ or $S_{\#i}$ denotes a corresponding scheduling related information.

In one embodiment of the invention scheduling information is sent by a network element of the radio access network having a scheduling function. In case of downlink data transmissions the scheduling information may indicate a resource on a downlink channel (e.g. shared downlink channel) to a receiver or group of receivers on which a transmission of a data packet is sent to the receiver (e.g. a mobile terminal or UE) or group of receivers so as to allow the respective receiver to receive the transmission. For uplink data transmissions, the scheduling information may be a scheduling assignment or grant that allocates an uplink resource on an uplink channel (e.g. a shared uplink channel) to a transmitter (e.g. mobile terminal or UE) for the transmission of uplink data.

In the exemplary embodiment shown in FIGS. 8, 10, 12 and 13 three logical channels are shown (the term "logical channel" should not be confused with the respective term as used in 3GPP-based mobile communication systems). The data channel refers to a channel transporting the data (e.g. data packets or PDUs). As indicated above, this channel may be an uplink or downlink channel.

The feedback channel is a logical channel on which the receiver of a transmission provides feedback to the transmitter for a respective transmitted data packet. In one embodiment, the feedback is provided by means of positive or negative acknowledgments as described in the Technical Background section above. The feedback information may thus indicate to the transmitter, whether a data packet has been decoded successfully by the receiver. The term logical channel thereby refers to a virtual channel on which the feedback information is sent to a single transmitter or plural transmitters.

Thus, in one embodiment of the invention a logical feedback channel may be associated to a particular code in the code domain and/or set of subcarriers or a subband in the frequency domain exclusively used for feedback signaling to a single transmitter or group of transmitters. In another embodiment related to uplink data transmissions (and thus downlink feedback signaling), the feedback information may be multiplexed with scheduling related information prior to mapping same on a control channel (transport channel or physical channel) for transmission to the transmitter of the data packets.

Furthermore, a logical scheduling related channel is provided. This channel may be a common or shared control channel provided in the downlink for transmitting scheduling related information as for example determined by a scheduling function of a network entity in the radio access network (e.g. base station or Node B) to the mobile terminals or UEs. Depending on whether the invention is practiced for the uplink or downlink data transmissions the scheduling information may have different content and may have different functions.

Considering the case of uplink data transmissions, the transmitter of the data packets may for example correspond to a mobile terminal (or UE). In this case the scheduling related channel may be a scheduling grant channel utilized for granting individual or groups of mobile terminals uplink resources for transmitting uplink data. For example, the scheduling information may be a scheduling grant or assignment for a mobile terminal or a group of terminals allocating a particular resource on an uplink channel (e.g. a shared uplink channel) to a mobile terminal or the group of terminals.

Considering the case of downlink data transmissions, the receivers of the data packets may for example correspond to a mobile terminal (or UE) while the transmitter may be for example a base station or Node B. The entity for sending the scheduling information may or may not be the same entity sending the data packets. Hence, in one exemplary embodiment the base station is the transmitter of the data packets on a downlink channel (for example a shared downlink channel) and the transmitter of the scheduling related information of the logical scheduling related channel. Furthermore the base station may comprise a scheduling function, e.g. a scheduling unit for scheduling the uplink transmissions. In this scenario, it may also be advantageous, if the feedback information is multiplexed together with the scheduling related information to a common channel for transmission to the receivers.

Furthermore, in the exemplary embodiments described with respect to FIGS. 8 to 13 in the following, it may be assumed that a synchronous retransmission protocol is utilized. Synchronous retransmissions may for example mean that retransmissions for a data packet in response to a negative feedback/acknowledgement is sent by the transmitter at a given or configured time instance, for example, after a predetermined time interval ($\Delta T$) upon having sent a previous transmission for a data packet (initial transmission or a previous retransmission). Alternatively, assuming a well-known timing relationship (for example a known or fixed time interval in-between) between feedback transmission and data transmission, the transmitter could also send the retransmission after a predetermined time span upon having received the (negative) feedback. Assuming further that scheduling information, data transmission and feedback signaling adhere to a (pre)configured and known timing relationship, synchronous retransmissions may also be sent after a predetermined or fixed time span upon having received or sent the scheduling information for a data packet.

As the time instance at which the retransmission is sent/received is thus known to receiver and transmitter, in one embodiment of the invention, the retransmissions are not scheduled by the scheduler. Accordingly, the transmitter may for example utilize the same radio resources for the retransmissions as used for the first transmission of the data packet. Alternatively, there may be a pre-defined or signaled pattern that denotes what resources are used for retransmissions, possibly depending on the resources that are used for previous transmissions.

It should be noted that in FIGS. 8 to 13 the scheduling interval and feedback interval also corresponds to $\Delta T$ for exemplary purposes. This is however not required, e.g. the scheduling interval and/or feedback interval may also be smaller or larger than the retransmission time interval.

Figure 8:
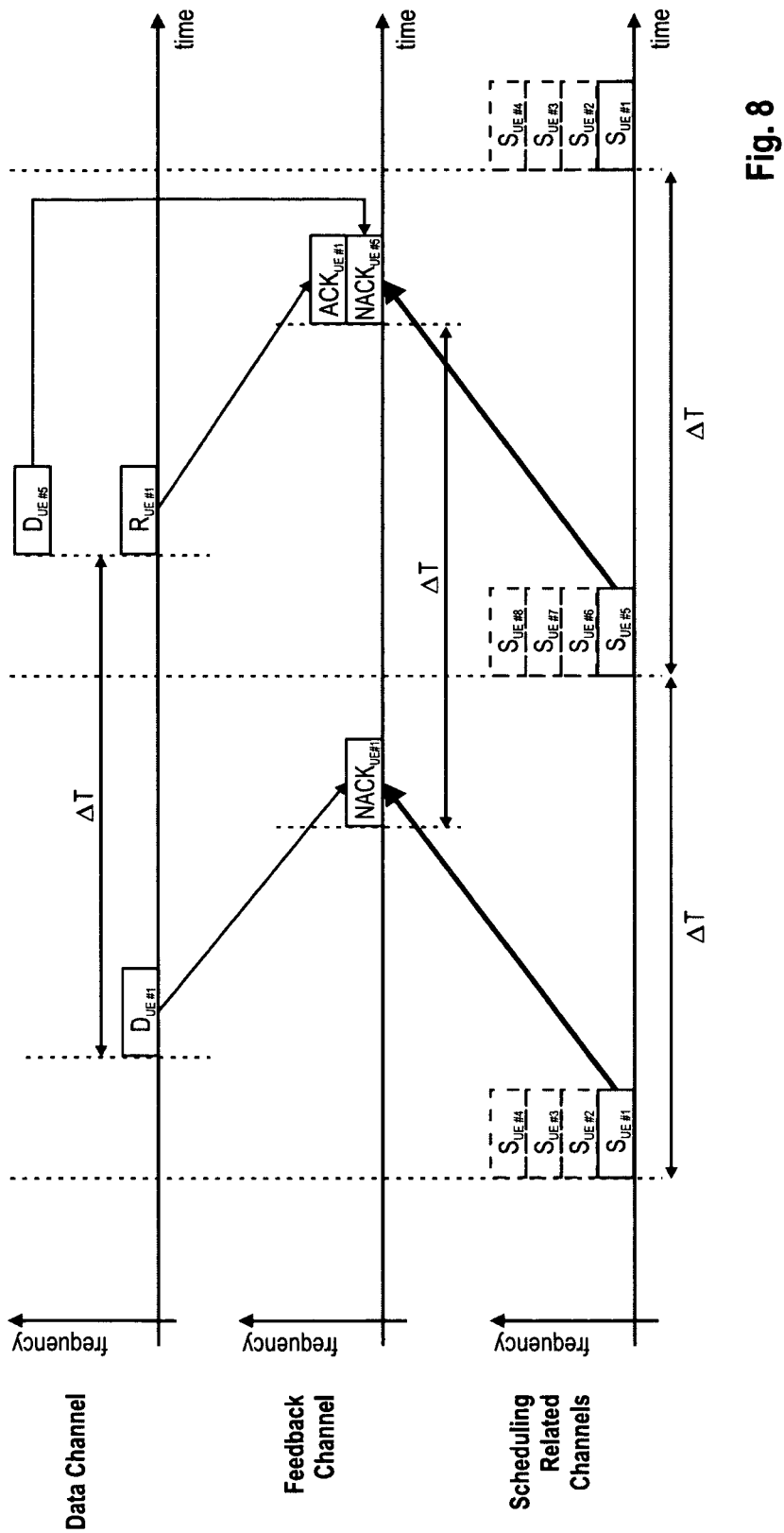
FIG. 8 shows an exemplary feedback transmission scheme according to an embodiment of the invention, where the resource for the transmission of feedback information for uplink data packets is selected based on the (index of) a scheduling related channel and a current transmission number for a mobile communication using FDM and TDM (OFDMA)

FIG. 8 shows a feedback transmission scheme according to an exemplary embodiment of the invention, where the resource for the transmission of feedback information for uplink data packets is selected based on the (index of) a scheduling related channel and a current transmission number for a mobile communication using FDM and TDM (as for example used in OFDMA). Accordingly, the axis of the different channels illustrate time and frequency domain.

For exemplary purposes it is assumed that there are four scheduling related channels, for example scheduling grant channels, provided. Each of the scheduling related channels may be used for allocating an uplink resource on the (uplink) data channel to one or a group of terminals. For simplicity, the description will focus on the scheduling related channel carrying scheduling information $S_{UE\ \#1}$ for granting an uplink resource to terminal UE #1 and data and feedback transmission in response to the scheduling grant to UE #1. Of course, the remaining scheduling related channels may be used to allocate resources to other users and may also cause data and feedback transmission by other users in a similar fashion as outlined for terminal UE #1 in the following.

Figure 9:
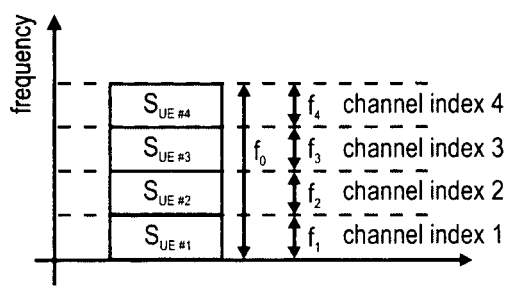
FIG. 9 shows an exemplary indexing of scheduling related channel in the frequency domain.

As shown in FIG. 9, each scheduling related channel may be associated to a respective subband or group of subcarriers $f_i$ of the available frequency resources. Accordingly, in this exemplary embodiment the different scheduling related channels are separated in the frequency domain. Accordingly, each scheduling related channel may be identified by a channel index number. The scheduling related channel with index 1 refers to the channel used for sending the scheduling grant to UE #1.

Upon receiving the scheduling information (grant) from the base station, the terminal UE #1 transmits a first or initial transmission of a data packet $D_{UE\ \#1}$ (e.g. a PDU) to the base station on the allocated resource.

The base station received the transmission and tries to decode that data packet. If failing to decode the data packet successfully, the base station sends a negative acknowledgment for the data packet to terminal UE #1 on the feedback channel. Thereby the feedback does not comprise an explicit terminal identifier, but the identification of the UE #1 as the destined receiver for the feedback is implicit to the resource on the feedback channel used for transmitting the negative acknowledgement. In this embodiment of the invention, it may be assumed that the channel index of a respective scheduling related channel used for granting the resources for uplink transmission (here for packet $D_{UE\ \#1}$) identifies a point in time at which the feedback for the scheduled data transmission by terminal UE #1 is sent by the base station on the associated feedback channel. For example, it may be configured or predefined in the system that feedback is sent with a predetermined offset to the scheduling related information for a respective user or to the reception of the data packet for which the scheduling information has granted the resources. I.e. in this exemplary embodiment, the channel index of the scheduling related channel is linked to a time resource of the radio resource for sending the feedback information.

The data packet $D_{UE\ \#1}$ sent by the terminal UE #1 may further include a current transmission number indicating that the data packet is the first transmission. Alternatively, in case of using HARQ the mobile terminal UE #1 and the base station may maintain a current transmission counter that is incremented each time a packet is received for a particular HARQ process (number). Upon successful decoding of a data packet of a HARQ process or upon the transmitter setting a new data indicator (indicating the transmission of a new data packet) this counter could be reset by mobile terminal UE #1 and base station.

Based on this current transmission counter, the base station may determine which frequency resource (frequency range/group of subcarriers) is to be used for the transmission of the feedback transmission.

Together, the channel index of the scheduling related channel and the current transmission counter uniquely identify the time resource and the frequency resource building of the radio resource on which the feedback information is transmitted to the mobile terminal UE #1 by the base station in response to data packet $D_{UE\ \#1}$. As the channel index and the current transmission number is known to base station and mobile terminal, both entities are capable of identifying the radio resource for transmitting the feedback message so as to transmit/receive same respectively.

As mentioned above, it is assumed for exemplary purposes that the base station has not been able to successfully decode data packet $D_{UE\ \#1}$. Accordingly, the base station will send a negative acknowledgement to the mobile terminal. Further, in this embodiment it is assumed for exemplary purposes that a synchronous retransmission protocol is used so that mobile terminal UE #1 sends a retransmission $R_{UE\ \#1}$ for the data after a predetermined time span ΔT upon having sent the previous transmission of the data packet.

Synchronous retransmissions may not be scheduled by the base station in this embodiment. Accordingly assuming for exemplary purposes that the scheduling interval is also equivalent to ΔT (the scheduling interval may also be larger or smaller than ΔT) the base station may utilize the scheduling related control channel of index 1 for sending a scheduling assignment to UE #5. As the base station is aware that UE #1 is sending a retransmission $R_{UE\ \#1}$ for data packet $D_{UE\ \#1}$ on the previously assigned resources (according to scheduling information $S_{UE\ \#1}$) the base station allocates another resource on the uplink data channel to mobile terminal UE #5.

Accordingly, mobile terminal UE #5 sends a data packet $D_{UE\ \#5}$ to the base station on another uplink resource than mobile terminal UE #1 sends its retransmission.

If the use of the scheduling related channel (i.e. its channel index) would be the only parameter for determining the radio resource for the feedback transmission, a collision of the feedback information for mobile terminals UE #1 and UE #5 would be the result in the above described scenario. However, as the radio resource for the feedback for mobile terminals UE #1 and UE #5 is determined also taking into account the channel index and the current transmission number of the respective data packet sent by the mobile terminal according to an embodiment of the invention, different radio resources may be determined and used by this combination of parameters so that feedback may be sent without causing collisions.

For example, as mobile terminal UE #1 has sent its first retransmission $R_{UE\ \#1}$ the current transmission counter yields another value than that for the first transmission DUE #5 for mobile terminal UE #5. Hence, the combination of channel index and current transmission number allows for the mapping of feedback information to different radio resources on the feedback channel thereby avoiding collisions.

In the example discussed with respect to FIG. 8 and FIG. 9, a system using an FDM and TDM on its channels has been assumed for exemplary purposes. However, a similar scheme may be used in systems utilizing CDM and TDM may be used. FIG. 8 shows a feedback transmission scheme according to an exemplary embodiment of the invention, where the resource for the transmission of feedback information for uplink data packets is selected based on the (index of) a scheduling related channel and a current transmission number for a mobile communication using CDM and TDM. Essentially, the solution is similar to the one discussed for FDM/TDM systems above except or the individual channels now being separated by in the code domain (by codes) instead of in the frequency domain (by means of different frequency ranges/subband/subcarriers).

A similar scheme may be used in systems utilizing only CDM, TDM, FDM, or any purely index-driven multiplexing scheme such as bit field(s) within a bit field structure. For example, if the total number of resources available for the feedback signal, e.g. ACK/NACK, is $N_{reserved}$, then feedback resource indices 1 through 4 may be used for the scheduling related channel index 1, feedback resource indices 5 through 8 may be used for the scheduling related channel index 2, etc., allowing for 4 feedback transmissions for each associated scheduling related channel. It should be further noted that this relation could also be ordered differently or non-continuously, as long as there exists an unambiguous relation between a scheduling related channel index and the corresponding feedback resource indices. Thus in an alternative mapping, feedback resource indices 5, 8, 12, 3 may for example be used for the scheduling related channel index 1, feedback resource indices 2, 1, 4, 7 may be used for the scheduling related channel index 2, etc.

Figure 11:
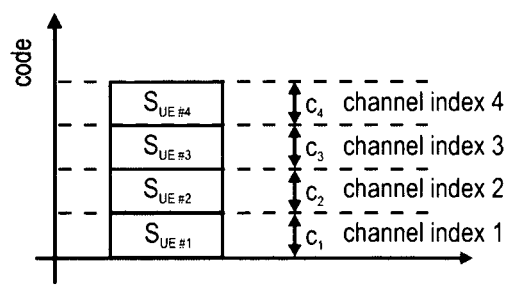
FIG. 11 shows an exemplary indexing of scheduling related channel in the code domain.
Figure 10:
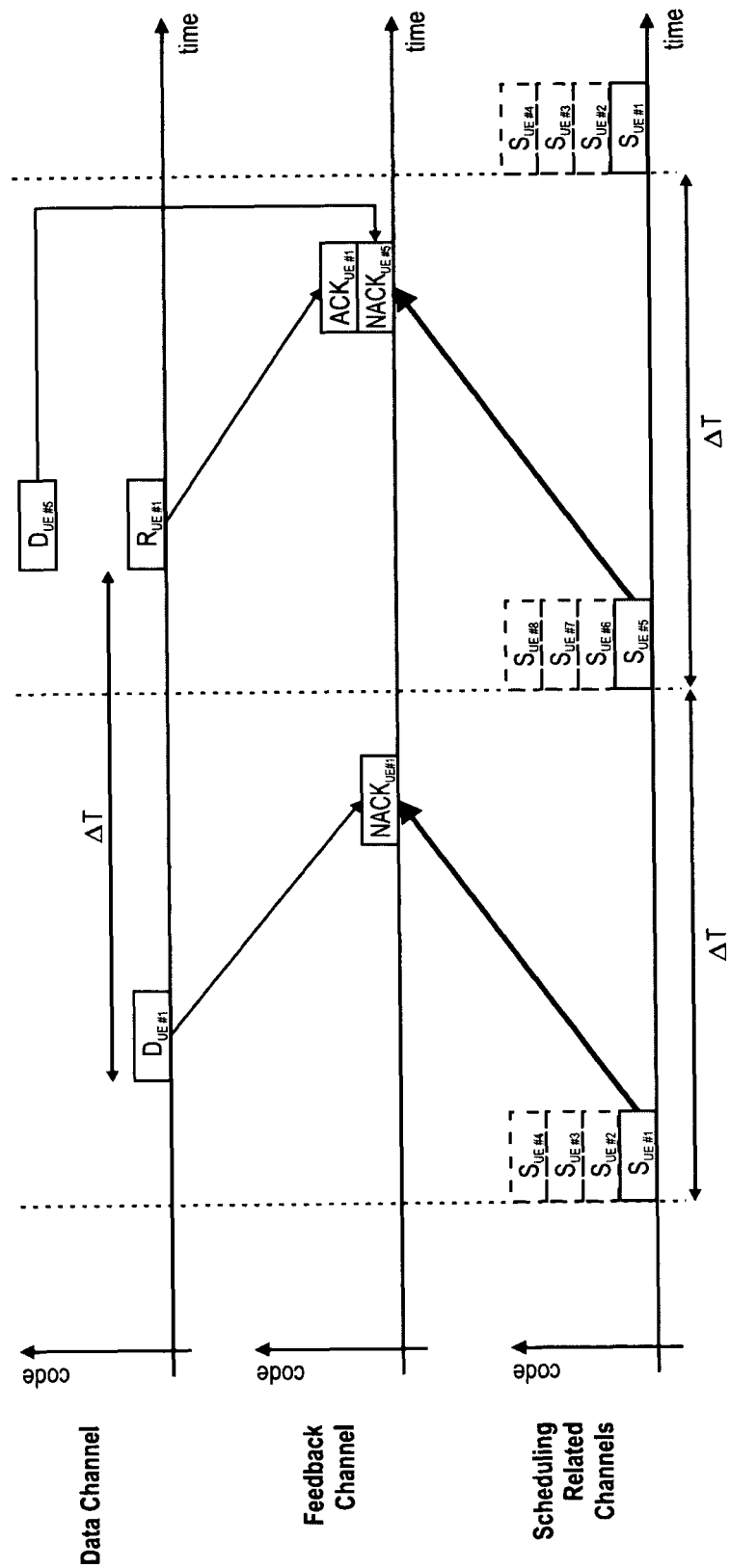
FIG. 10 shows an exemplary feedback transmission scheme according to an embodiment of the invention, where the resource for the transmission of feedback information for uplink data packets is selected based on the (index of) a scheduling related channel and a current transmission number for a mobile communication using CDM and TDM.

Accordingly, as shown in FIG. 11, in this exemplary embodiment the individual scheduling related channels may be separated by different codes. Similar to the example shown in FIG. 8, the scheduling related channels determine the time resource in the time domain of the radio resource on which the feedback information is to be transmitted. However, in the example of FIG. 10, the data transmission on the data channel by the mobile terminals (or more precise the current transmission number of the respective transmission) may be associated to respective distinct codes in the code domain so as to separate the feedback on the feedback channel.

Further, it should be noted that the examples discussed with respect to FIG. 8 to FIG. 11 above may be easily extended to systems using a combination of FDM, CDM and TDM (for example in ODCDMA or MC-CDMA systems). For example, in those systems the scheduling related channel (index) may identify a time resource for the feedback, while the current transmission counter is associated to a certain code and/or frequency resource in the code and/or frequency domain. In another example, scheduling related channel (index) may identify a time resource and frequency or code resource for the feedback, while the current transmission counter is associated to a certain frequency resource or code respectively.

Further, it should be noted that in the examples and figures the different scheduling related channels are distinguished by frequency or time domain. However it should be obvious to those skilled in the art that the distinction may further be realised in time domain, spatial domain, or by e.g. bit fields within an overall signal structure.

As can be recognized several different solutions may be possible. The only limiting factor is that the combination of scheduling related channel index and current transmission number results in a unique mapping to a radio resource for feedback provision known to transmitter and receiver.

It has been previously mentioned that in order to send feedback signaling on different resources so as to avoid collisions, a number of $N_{reserved}$ may be reserved. These reserved resources may for example be codes when using CDM techniques, subbands/subcarriers or frequency ranges when using FDM techniques (including OFDM localized and distributed mode transmissions) or time-slots/subframes/modulation symbols or OFDM symbols/frames, etc. when using TDM techniques. Of course also a combination of the different multiplexing techniques on the radio channels may be used.

In one embodiment of the invention, the number $N_{reserved}$ of reserved resources per scheduling related channel may be for example chosen so as to correspond to the maximum number of transmissions allowed by the retransmission protocol for a single data packet. Using for example HARQ as a retransmission protocol, the number $N_{reserved}$ may for example correspond to the Maximum Number of Retransmissions+1 for a PDU transmitted by the HARQ protocol. If different HARQ processes are available, $N_{reserved}$ may be set to the maximum number of retransmissions of the HARQ process allowing for the highest number of retransmissions.

However, the reservation of $N_{reserved}$ distinct resources for feedback transmission may be undesirable, e.g. due to the potential waste of resources. For example, if the maximum number of transmissions is 8 and using CDM techniques for feedback resource separation, 8 codes would have to be reserved in the system per scheduling related channel. Assuming for exemplary purposes that more than 95% of the data packets transmitted using a retransmission protocol may be successfully decoded after the third transmission of a data packet (e.g. after code combining initial transmission and the two retransmissions), more than half of the reserved resources are not frequently used by the system at all.

Moreover, in a further embodiment of the invention, it may be assumed that incremental redundancy techniques are used in the retransmission protocol, where so called different redundancy versions are utilized for different (re)transmissions of a single data packet as described above (please refer to section "Redundancy Version and Combining" above). Thereby, the number of redundancy versions has a strong impact on the probability that a data packet may be successfully decoded after having employed all redundancy versions for transmission (typically more than 95% of the data packets can be decoded successfully upon having utilized all available redundancy versions). The number of redundancy versions may be typically (but not necessarily) smaller than the maximum number of transmissions allowed for a data packet so that it is likely that a data packet could be correctly decoded after fewer than the maximum number of allowed transmissions. Hence, in this embodiment, the number of $N_{reserved}$ reserved resources for the feedback signaling may be set taking into account (ideally identical to) the number of redundancy versions used for transmitting a data packet.

In another embodiment of the invention the number $N_{reserved}$ of reserved resources for the feedback signaling is chosen such that it corresponds to the number of transmissions ensuring a correct decoding of the data packet in more than (or equal to) a threshold probability measure. For example, this threshold probability measure could be 95% or 99%. This reliability may for example be reached by setting $N_{reserved}$ to a value greater than the number of available redundancy versions but lower than (or in the extreme case equal to) the maximum number of transmissions for a data packet.

However, setting the number of $N_{reserved}$ of reserved resources for the feedback signaling optimistically, collisions may occur, for example, in case that the number of reserved ACK/NACK resources is not sufficient to account for all eventualities. According to another embodiment of the invention it may be thus foreseen that feedback for data transmissions are sent on a so-called shared feedback channel for example when the current transmission counter of a data packet exceeds the number of reserved resources for the respective feedback channel. This channel may for example require identifying the destined transmitter of the data packets for which the feedback is sent by means of some sort of identifier transmitted along the feedback information (e.g. ACK/NACK) to identify the corresponding data packet or retransmission thereof. In an exemplary embodiment such identifier may comprise the channel index of the scheduling related channel and the current transmission counter of the corresponding data packet.

Another solution of this potential drawback of an optimistic feedback resource reservation according to another embodiment of the invention is to consider the reserved radio resources for feedback transmission to form a cyclic shift register for feedback radio resources (within the time domain, frequency domain, code domain, MIMO layers, etc. or an arbitrary combination of these channel division techniques). Assuming for exemplary purposes that there are $N_{reserved}=3$ feedback radio resources reserved per feedback channel in the system (e.g. due to using three redundancy versions for transmission), the feedback resource of the first or initial transmission of a data packet is thus sent on a first feedback radio resource corresponding to a first position in the cyclic shift register. If this first or initial transmission is negatively acknowledged, the feedback for the first retransmission would be mapped to a second feedback radio resource corresponding to the next, second position in the cyclic shift register. Similarly, if also the first retransmission is negatively acknowledged, the feedback for the second retransmission is sent on a third feedback radio resource corresponding to the third and last position in the cyclic shift register.

If also the second retransmission is not positively acknowledged, the next resource for the feedback for the third retransmission is thus obtained by cycling back to the first feedback radio resource (i.e. the feedback radio resource used for the initial or first transmission). However, this potentially allows for a collision of feedback, if for example the scheduler uses the scheduling related channel associated to the first feedback radio resource for sending scheduling information. To avoid this drawback, the scheduler may not use the scheduling related channel associated to the first feedback radio resource, if feedback for a retransmission is to be sent on a feedback radio resource corresponding to a feedback resource for the first or initial transmission of a the data packet for which the retransmission is sent.

To summarize, the index of the feedback radio resource to use (assuming that each of the $N_{reserved}$ feedback radio resources is identified by an index) may be for example determined using the following equation:

$$\text{feedback resource index} = \text{current transmission counter MOD } N_{reserved} \quad (1)$$

where MOD is the modulo operation finding the remainder of division of one number by another. Thus, if a retransmission yields a feedback resource index=1 for the feedback signaling, the scheduler should stall use of the scheduling related channel for this feedback resource.

In the example above, in case of a positive acknowledgement of a data packet the feedback radio resource is determined as described above as well.

If a feedback radio resource is not used (e.g. due to prior positive acknowledgement of a data packet) the transmitter of the feedback signaling entity may mute the respective unused resource according to one embodiment of the invention. This may for example allow reducing transmission power consumption and/or interference.

The smaller the number $N_{reserved}$ of reserved feedback resources for the feedback signaling, the more frequently the feedback resource index yields a value of 1 for a retransmission so that the associated scheduling related channel may not be used for signaling scheduling information. In one embodiment, $N_{reserved}$ may be even smaller than the number of redundancy versions. Though this may potentially repeatedly lead to preventing use of the scheduling related channel associated for a first or initial transmission of new data packet, this theoretic disadvantage might have no significant impact on the overall system performance, if the use of the first $n=N_{reserved}$ redundancy versions yields a sufficiently high probability for successfully transmitting a data packet.

Figure 12:
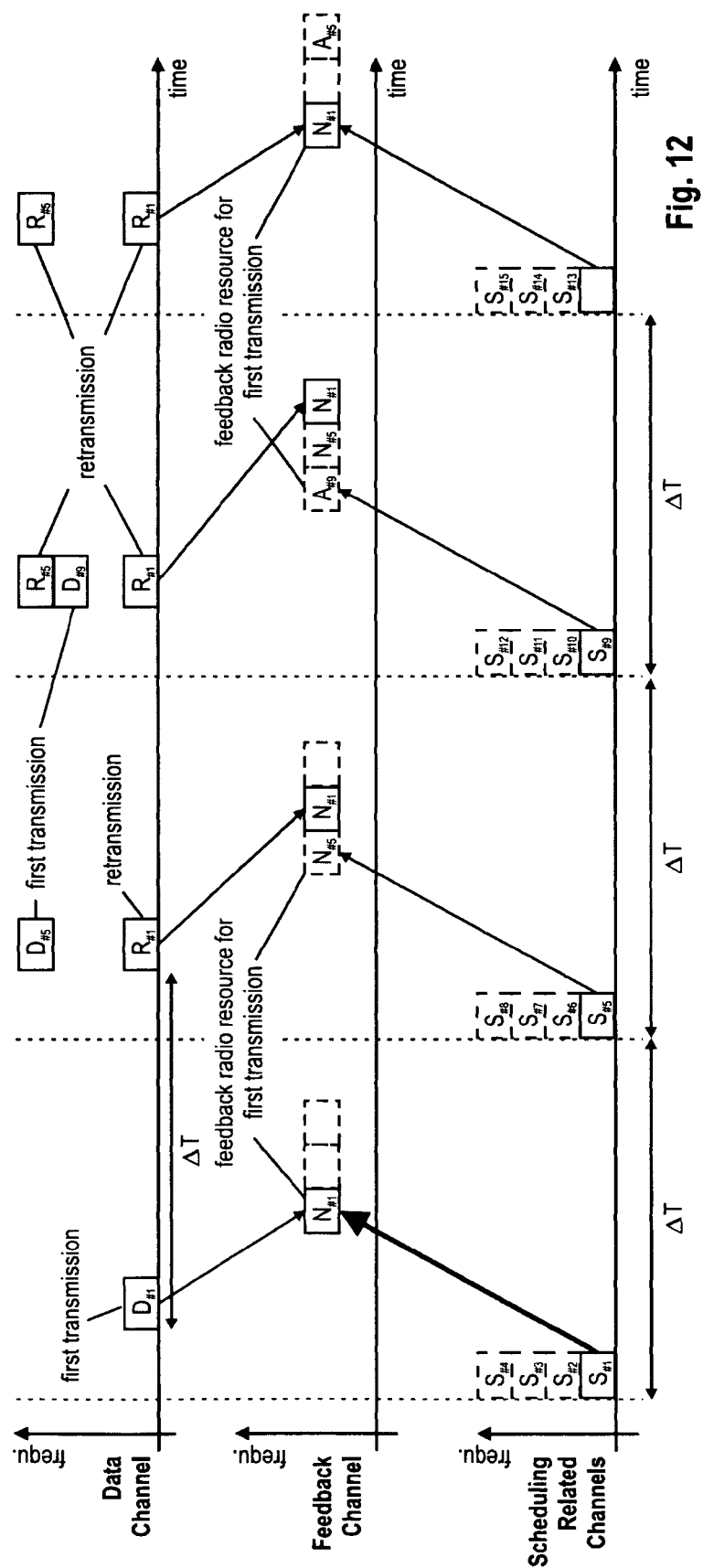
FIG. 12 shows a feedback transmission scheme according to an exemplary embodiment of the invention, where the resource for the transmission of feedback information for uplink data packets is selected based on the (index of) a scheduling related channel and a current transmission number for a mobile communication using FDM and TDM and where the number of reserved resources per feedback channel for feedback signaling is limited

FIG. 12 shows a feedback transmission scheme according to an exemplary embodiment of the invention, where the resource for the transmission of feedback information for uplink data packets is selected based on the (index of) a scheduling related channel and a current transmission number for a mobile communication using FDM and TDM (as for example used in OFDMA) and where the number of reserved resources per feedback channel for feedback signaling is limited. For exemplary purposes, $N_{reserved}$ is assumed to be equal to three.

In FIG. 12, it is assumed for exemplary purposes that the $N_{reserved}$ feedback resources are distributed in TDM fashion, i.e. the feedback resources are located at different temporal positions on the feedback channel in the time domain. For example, each feedback resource may be associated to one or a subset of OFDM symbols in a subframe or slot of a subframe, a slot of a subframe, a subframe in the time domain. The location of the feedback radio resource in the frequency domain (and/or code domain) may for example be determined by the scheduling related channel on which the scheduling information for the data for which the feedback is to be provided is sent. The current transmission counter of the data packets sent by the transmitter, e.g. the mobile terminals, determines the temporal position of the feedback resource to use. For example, the current transmission counter may yield that the feedback information is mapped to the first, second or third OFDM symbol (or set of symbols) in a subframe.

Upon allocating uplink resources to mobile terminal UE #1 by means of the scheduling information (e.g. scheduling grant) $S_{\#1}$, the mobile terminal UE #1 transmits a first transmission for a data packet $D_{\#1}$ on the scheduled resource. Based on the scheduling related channel index mobile terminal UE #1 as well as the base station sending the data packet $D_{\#1}$ may determine the frequency domain resource, e.g. subband, for feedback provision and a reference point in time (e.g. start of a subframe or frame) relative to which the current transmission counter indicates temporal position of the feedback. The handling and use of current transmission counter may be similar as described previously for FIG. 8 and FIG. 9. Together, the scheduling related channel index (see FIG. 9) and the current transmission counter unambiguously identify the radio resource on what resource the base station sends the feedback information for transmission packet $D_{\#1}$.

Assuming that the first transmission $D_{\#1}$ is not decoded successfully by the base station, mobile terminal UE #1 sends a synchronous retransmission (as indicated by ΔT) in response to the feedback signal $N_{\#1}$. As the retransmissions are sent synchronous no scheduling thereof is foreseen in this exemplary embodiment. The feedback for this retransmission $D_{\#1}$ is sent in the "next" reserved feedback resource, while the first feedback resource is used for the negative feedback $N_{\#5}$ for a data packet $D_{\#5}$ of mobile terminal UE #5 that has been scheduled ($S_{\#5}$) using the same scheduling related channel as for the scheduling of UE #1.

Next, mobile terminal UE #9 is scheduled using the same scheduling related channel as mobile terminals UE #1 and UE #5. Accordingly, mobile terminal UE #9 send a first transmission $D_{\#9}$ of a data packet on the data channel, while mobile terminals UE #1 and UE #5 provide synchronous retransmissions $R_{\#1}$ and $R_{\#5}$ respectively. Based on the combination of scheduling related channel index and current transmission number of the mobile terminals the feedback information are mapped to the three available distinct radio resources as explained previously. It is assumed for exemplary purposes that the base station positively acknowledges $A_{\#9}$ the data packet of mobile terminal UE #9, while negative acknowledgments $N_{\#1}$ and $N_{\#5}$ are sent for the packets of mobile terminal UE #1 and UE #5.

In the next interval, the mobile terminal $UE_{\#1}$'s current transmission number CTN (or current transmission counter) would be equal to four (i.e. CTN=4) so that the feedback for the third retransmission $R_{\#1}$ of the data packet is to be mapped on the first feedback radio resource again (i.e. the same feedback radio resource that would be yielded for feedback transmission for a first transmission of a data packet by the combination of channel index and the current transmission number for a first transmission). As explained above, e.g. if equation (1) above yields a feedback resource index=1, a feedback collision may occur. To avoid potential feedback collisions, the retransmission entity in the base station may inform the scheduler on the potential collision (for example by signaling the channel index of the associated scheduling related channel). According to this indication, the scheduler does not use the scheduling related channel with the indicated index for the transmission of scheduling information for a new data packet.

In the rightmost interval in FIG. 12, this stalling of the scheduler for the scheduling related channel is indicated by the blank rectangle on the scheduling related channel(s). The mobile terminals UE #1 and UE #5 send their retransmissions $R_{\#1}$ and $R_{\#5}$. Due to the current transmission counter for mobile terminal $UE_{\#1}$ the feedback for the retransmission $R_{\#1}$ is mapped to the first feedback resource (feedback radio resource for the first transmission) causing no collision, since the associated scheduling related channel has not been used for the transmission of a new data packet. Further, it should be noted that feedback for UE #9 would need to be mapped to the second feedback resource. Due to acknowledging (see $A_{\#9}$) the data packet of mobile terminal UE #9 in the previous interval, no synchronous retransmission is sent by mobile terminal UE #9 so that also no feedback needs to be signaled on the feedback channel. Accordingly, no information is sent in the second feedback resource, which is referred to as muting of the feedback resource. By using muting of unused feedback channel resources the transmit power may be shared between used feedback resources. Further, the muting of feedback resources may reduce interference to other signals.

FIG. 12 shows an example relating to uplink data transmissions. However, similar as for FIG. 8, the example is also applicable for downlink data transmissions. In the latter case the scheduling related channels may correspond to a shared downlink control channel or downlink control channels, for providing resource indications for the downlink data transmissions on the data channel to the users (mobile terminals). Accordingly, the data channel in FIG. 12 may be a shared downlink channel, while the feedback channel would provide feedback in the uplink correspondingly.

Figure 13:
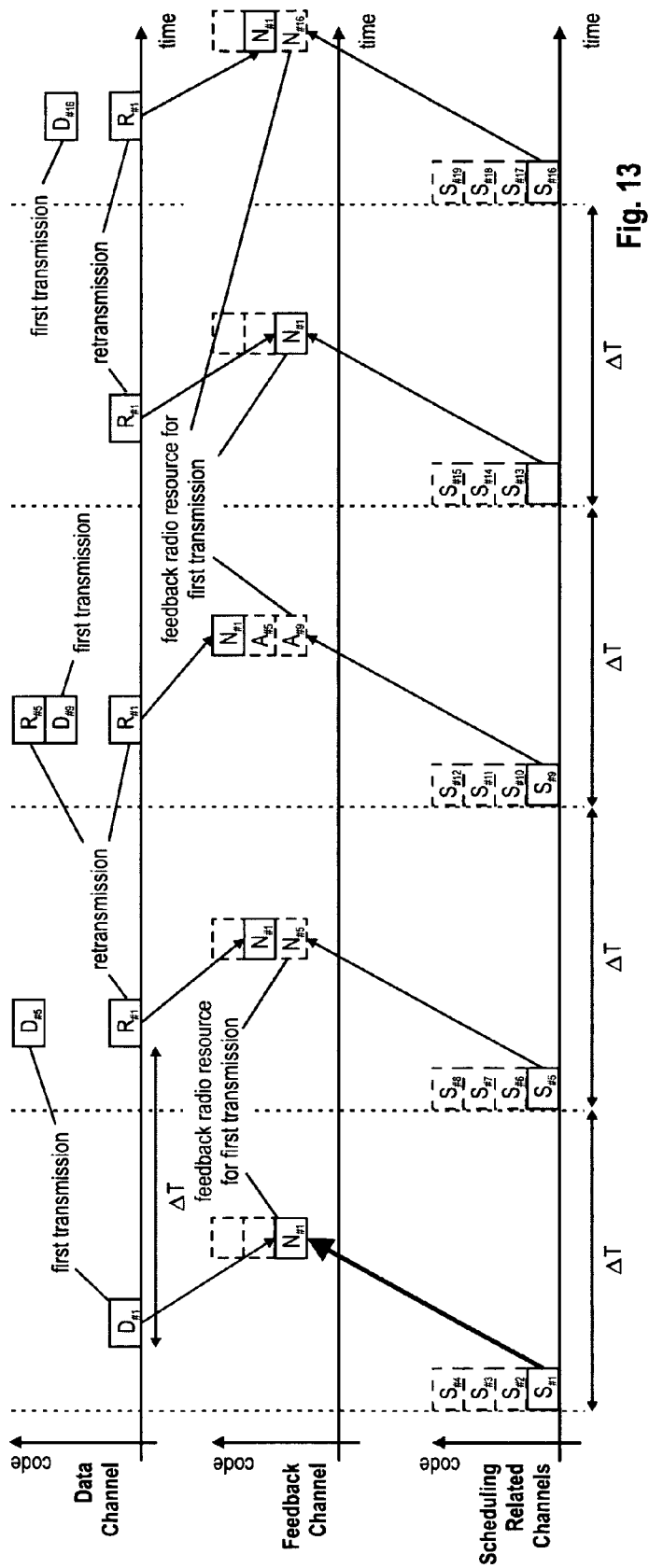
FIG. 13 shows a feedback transmission scheme according to an exemplary embodiment of the invention, where the resource for the transmission of feedback information for uplink data packets is selected based on the (index of) a scheduling related channel and a current transmission number for a mobile communication using CDM and TDM and where the number of reserved resources per feedback channel for feedback signaling is limited

FIG. 13 shows a feedback transmission scheme according to an exemplary embodiment of the invention, where the resource for the transmission of feedback information for uplink data packets is selected based on the (index of) a scheduling related channel and a current transmission number for a mobile communication using CDM and TDM and where the number of reserved resources for feedback signaling is limited. For exemplary purposes, $N_{reserved}$ is assumed to be equal to three, i.e. three different codes per feedback channel are configured and specify respective feedback resources. Essentially, FIG. 12 and FIG. 13 correspond to each other. In FIG. 13, it is however assumed for exemplary purposes that the $N_{reserved}$ feedback resources are distributed in CDM fashion, i.e. the feedback resources are located at different codes in the code domain. Hence, in the exemplary embodiment of FIG. 13, the feedback for scheduled first transmissions and unscheduled retransmissions may occur simultaneously in the time domain, since the different feedback signals may be distinguished by their codes.

As for FIG. 12, also the exemplary embodiment show in FIG. 13 may be implemented for downlink data transmissions and uplink data transmissions as explained above.

Generally, the scheduling related channels and/or the reserved feedback resources (which may also be denoted feedback channels) can be arranged in a two-dimensional array, where one dimension represents the scheduling related channel index or feedback channel index respectively, and the other dimension represents the transmission count for a data packet. Alternatively, the scheduling related grant channels and/or feedback resources may be arranged on a one-dimensional fashion, which may be obtained by rearranging the mentioned two-dimensional array into a one-dimensional string. Those skilled in the art will perceive that such representation issues are no restricting the invention or its applicability in any way.

Figure 14:
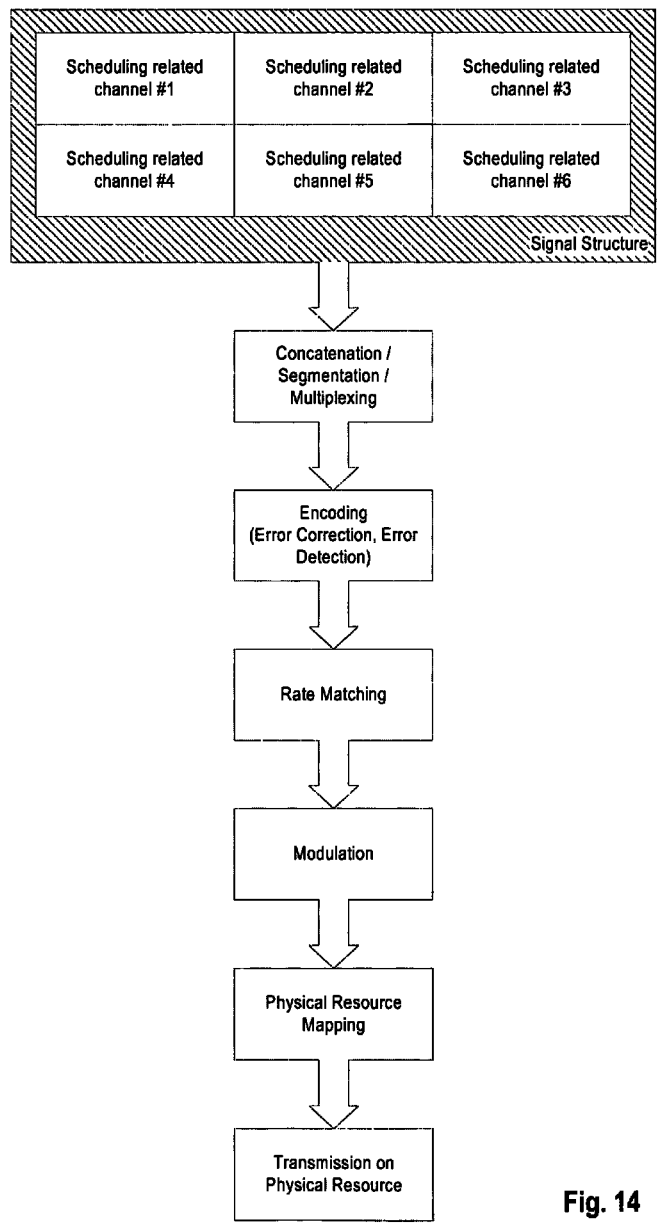
FIGS. 14 & 15 show exemplarily illustrate the arrangement of scheduling related channels and feedback channels in a two dimensional array, respectively, according to different embodiment of the invention and an exemplary mapping of the respective resulting signal structure to physical channel resources.
Figure 15:
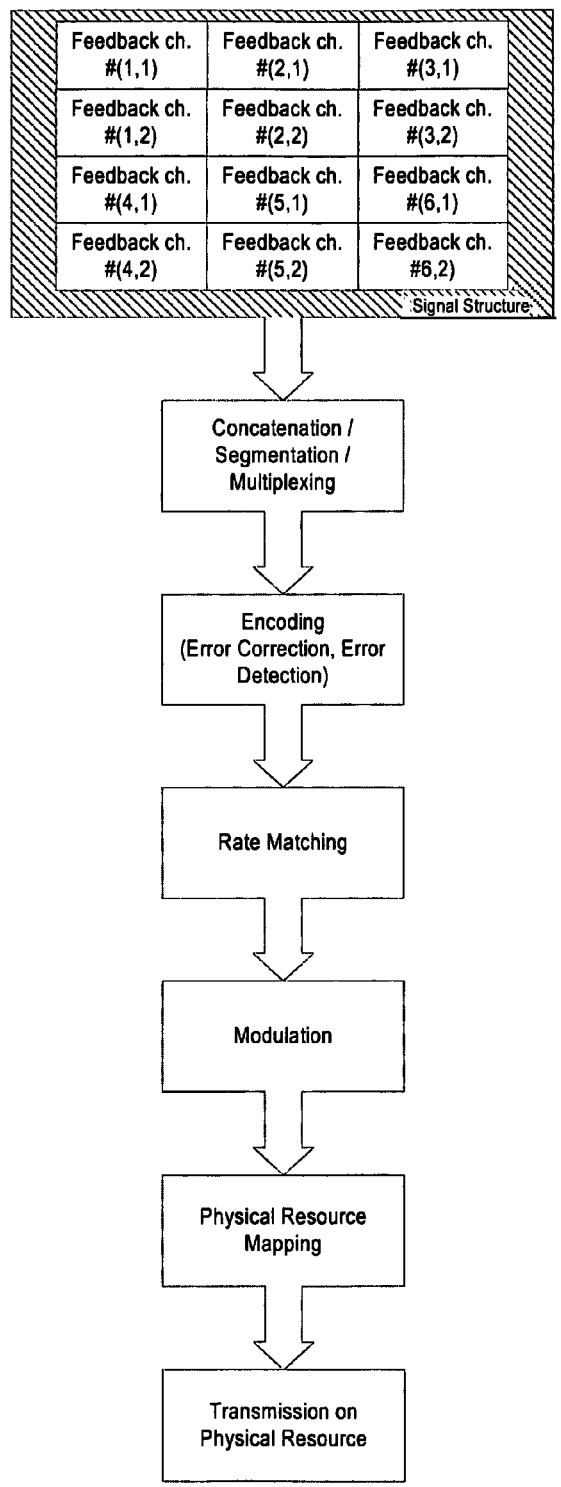

Furthermore, there may be an unambiguous assignment between an feedback resource in terms of an index into such a one-dimensional or two-dimensional array and the actual physical resource where said feedback (e.g. ACK/NACK) is transmitted. For example, one dimension may represent a subcarrier index, while the other dimension may represent a time index. According to one embodiment there may be a relation between the feedback resource index (or feedback channel index) and one or more of the following physical resources:

time/time slot/subframe/frame/transmission time interval,
    frequency/carrier/subcarrier/resource unit,
    code/spreading code/scrambling code,
    polarization,
    antenna/virtual antenna/MIMO stream FIG. 14 and FIG. 15 exemplarily illustrate the arrangement of scheduling related channels and feedback channels in a two dimensional array, respectively, according to different embodiment of the invention and an exemplary mapping of the respective resulting signal structure to physical channel resources. In this example, the scheduling related channels and/or the feedback channels may be considered carrying Layer 1/2 information to be mapped on Layer 1 resources. Comparing the signal structure of the scheduling related channels in FIG. 14 to that of the reserved feedback channel resources in FIG. 15, one will recognize that each scheduling related channel is associated to two feedback channel resources (which, depending on the definition of a feedback channel may be considered to form two separate feedback channels, one for each data transmission, or a single feedback channel for a group of data transmissions). Hence, scheduling related channel i is associated to the feedback channels (i, 1) and (i, 2).

Both signal structures in FIG. 14 and FIG. 15 may be subject to concatenation/segmentation and/or multiplexing. If the scheduling related channels and the feedback channels are transmitted in the downlink, same may be multiplexed in this step. Further, both signal structures may be subject to encoding and rate matching (e.g. b means of puncturing) prior to modulating and mapping the resulting bit stream(s) to the physical resource for transmission.

Figure 16:
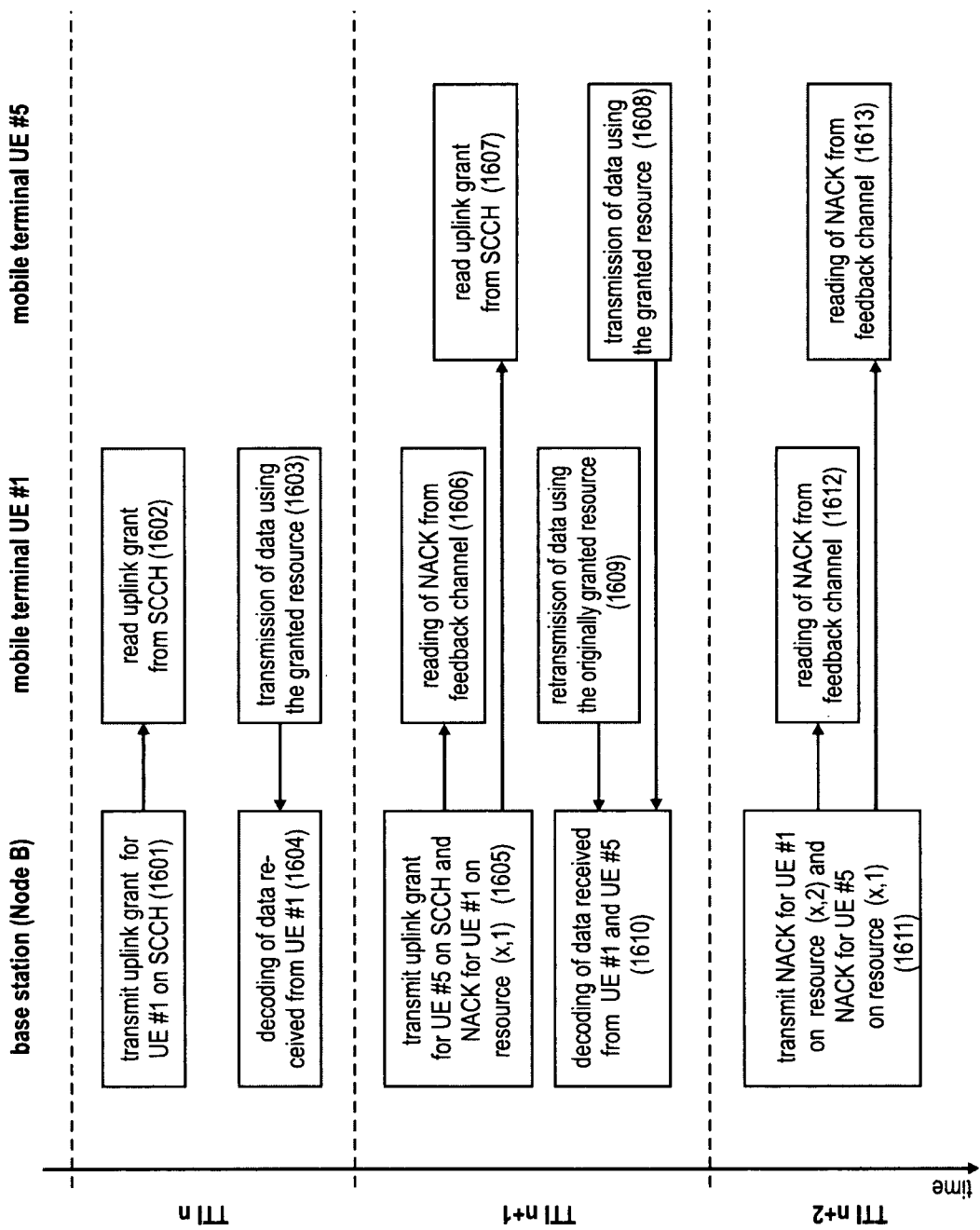
FIG. 16 shows an exemplary a flow chart essentially exemplifying the concept of the processes shown in FIGS. 8, 10, 12 and 13 according to another embodiment of the invention.

FIG. 16 shows a flow chart essentially exemplifying the concept of the processes shown in FIGS. 8, 10, 12 and 13 according to another embodiment of the invention. For exemplary purposes, a flow chart relating to uplink data transmissions from mobile terminals UE #1 and UE #5 is shown. In a first time interval, which may be referred to as a transmission time interval TTI with index n (or a subframe/frame) in the time domain, the scheduling entity (here located in the base station) grants an uplink resource to mobile terminal UE #1 by sending 1601 a scheduling grant message on a uplink scheduling related control channel, for example a Shared Control CHannel (SCCH). Terminal UE #1 reads 1602 the grant message from this control channel and sends 1603 a first transmission of a data packet on the granted uplink resource. The current transmission counter maintained by the base station and mobile terminal UE #1 may yield a counter value of 1 for the initial transmission of the data packet (or alternatively 0 if incrementing the counter, or equal to the maximum transmission number for the data packet or the maximum transmission number for the data packet minus one if decrementing the counter).

Moreover, it is assumed for exemplary purposes that the base station is not only including a scheduling entity (scheduler) but is also the radio access network entity terminating the retransmission protocol utilized for data transmission with the mobile terminals. Upon having received the first transmission data packet by the retransmission protocol (e.g. upon demodulation and inverting an optional rate matching process e.g. by de-puncturing), the base station tries to decode 1604 the data packet (e.g. a HARQ PDU if utilizing a HARQ retransmission protocol).

Depending on the result of the decoding step, the base station sends a positive (ACK) or negative (NACK) acknowledgment of the data packet to mobile terminal UE #1. In the example shown in FIG. 16, it is assumed for exemplary purposes that the data packet sent by terminal UE #1 in step 1603 could not be successfully decoded so that a NACK is sent 1605 as feedback to mobile terminal UE #1. The NACK may be sent on one of plural feedback resources. The feedback resource for transmitting the feedback may be determined by at least the current transmission counter and (optionally) by the channel index or resource index of the control channel on which the scheduling grant has been sent to mobile terminal UE #1 in step 1601.

Further, the base station's scheduling entity may further utilize the same control channel that has been used for sending a scheduling grant to terminal UE #1 in step 1601 to send 1605 a scheduling grant to mobile terminal UE #5. Mobile terminal UE #1 reads 1606 the NACK from the feedback channel, which triggers the retransmission protocol to send an unscheduled retransmission of the data packet (e.g. after a given pre-defined time interval). Mobile terminal UE #5 received 1607 the grant from the control channel and in response thereto sends 1608 a first transmission of a data packets to the base station. As for terminal UE #1, the base station and terminal UE #5 also maintain a current transmission counter for the packet sent by UE #5.

Mobile terminal UE #1 proceeds with sending 1609 the unscheduled retransmission of the data packet to the base station. The retransmissions by mobile terminal UE #1 may be for example sent on the same uplink resource as the first transmission of the data packet, i.e. on the same resource as granted in step 1601. Additionally, mobile terminal UE #1 and the base station increment the current transmission counter for the data packet of mobile terminal UE #1.

The base station receives 1610 the transmissions of terminal UE #1 and UE #5 and tries to decode the packets in a similar fashion as described for step 1604. If the retransmission protocol provides soft combining, the first transmission of the data packet has been maintained in a soft buffer by the base station and the base station may combine (e.g. code combining) the all received transmissions of terminal UE #1 for a single data packet (here, the first transmission and the first retransmission) prior to decoding.

Similar to step 1605, the base station may be assumed to having not been able to decode the packets by terminals UE #1 and UE #5 successfully. Accordingly, the base station may determine a feedback resource for transmitting the feedback for terminal UE #1 and UE #5 respectively, taking into account at least the current transmission counter for a respective data packet and (optionally) by the channel index or and resource index of the control channel on which the scheduling grant has been sent to mobile terminals in step 1601 and step 1605. Accordingly, the NACKs for terminal UE #1 and UE #5 will be mapped on two different feedback resources for transmission in step 1611 and are received without collision by terminal UE #1 in step 1612 and terminal UE #5 in step 1613.

The invention according to the different embodiments described herein is also applicable in communication systems where there is a fixed/pre-defined relation between granted resources for initial transmission of a packet and used resources for retransmissions (e.g. retransmission resource hopping) Alternatively, there may be a pre-defined or signaled pattern that denotes what resources are used for transmitting of scheduling related information. Accordingly the resource for transmitting a respective scheduling related channel may also change over time.

In a further embodiment, the number of reserved feedback resources of the respective feedback channels may be different. For example, if a one-to-one correspondence between scheduling related channels and feedback channels is provided, the scheduling related channels (e.g. grant channels) #1 to #4 corresponding to feedback channels (e.g. ACK/NACK channels) #1-#4 may reserve a first number of resources for feedback (e.g. HARQ feedback), while scheduling related channels #5 to #6 corresponding to feedback channels #5-#6 may reserve a second number of resources for the feedback.

As indicated above, the invention may be advantageously employed in mobile communicating systems, such as 3GPP-based systems. In particular, the invention may be applicable to the SAE/LTE of future 4G communications networks. Further, in one exemplary embodiment, the retransmission protocol for transmitting and retransmitting the data packets as well as feedback (ACK/NACK) signaling may be a HARQ protocol as described in the Technical Background section.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

For example, the different functions of scheduling, data transmission and feedback transmission may be implemented in software and/or hardware within different entities in a communication in hardware and software. For downlink data transmission, the function of scheduling may be implemented by a radio resource control entity in the mobile communication systems access network, e.g. a base station or radio network controller. The entity implementing the (re)transmission-part of a retransmission protocol for transmitting and retransmitting data may be for example a base station. Accordingly, a mobile terminal may implement the feedback-part of the retransmission protocol so as to send the feedback information. For uplink data transmissions, the mobile station may implement (re)transmission-part of a retransmission protocol for transmitting and retransmitting data while a base station may implement the feedback-part of the retransmission protocol so as to send the feedback information.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A mobile communication system comprising:
a mobile terminal; and
a base station to communicate with the mobile terminal feedback information of a retransmission protocol for a transmitted data packet, wherein
the feedback information for a respective data packet is transmitted on a radio resource having a location that is determined according to a counter value indicative of a number of transmissions that have taken place for the respective data packet to avoid collisions of the feedback information with parallel transmissions, wherein:
the radio resource for transmitting feedback information for a data packet is determined according to a radio resource used for transmitting scheduling information for a first transmission of the data packet and the current counter value of the data packet, and wherein:
the scheduling information is a scheduling grant for allocating an uplink resource to the mobile terminal for transmitting the data packet on an uplink, or
the scheduling information indicates a downlink resource on which the data packet is transmitted to the mobile terminal,
the retransmission protocol provides synchronous retransmissions of the data packet, where retransmissions of the data packet are sent without prior transmission of scheduling information for a retransmission and in the retransmission protocol, retransmissions are sent after a pre-configured time span upon having received (i) feedback information for a previous transmission of the data packet, (ii) a previous transmission of the data packet, or (iii) the scheduling information for the data packet,
there is a number of Nfr feedback resources reserved for feedback transmission in the communication system each being associated to a feedback resource index, and
each feedback resource for providing feedback for a respective data packet is chosen based on the equation:

feedback resource index=(current transmission number)modulo $N_{fr}$.

2. The mobile communication system according to claim 1, wherein the radio resource used for transmitting scheduling information is derived from an index chosen from a plurality of scheduling related control channels.

3. The mobile communication system according to claim 1, wherein the radio resource for transmitting feedback information for the data packet is determined according to a radio resource used for transmitting a first transmission of the data packet.

4. The mobile communication system according to claim 1, further comprising:
a receiving entity to receive the feedback information for the data packet, wherein the receiving entity selects at least one of a code, MIMO layer, a reception timing and a frequency range for the reception of feedback information according to a channel index of a scheduling related a channel and the number of transmissions of the packet that have taken place, and/or a transmitting entity to transmit the feedback information for the data packet, wherein the transmitting entity selects at least one of a code, MIMO layer, a reception timing and a frequency range for the transmission of the feedback information according to the channel index of a scheduling related channel and the number of transmissions of the packet.

5. The mobile communication system according to claim 1, further comprising a predetermined relation between a transmission resource of scheduling information on a scheduling related channel and at least one of a code, a reception timing and a frequency range for the transmission of the feedback information known to a transmitting entity sending the feedback information and a receiving entity receiving the feedback information.

6. A mobile communication system, comprising:
a mobile terminal; and
a base station to communicate with the mobile terminal feedback information of a retransmission protocol for a transmitted data packet, wherein:
the feedback information for a respective data packet is transmitted on a radio resource having a location that is determined according to a counter value indicative of a number of transmissions that have taken place for the respective data packet to avoid collisions of the feedback information with parallel transmissions, wherein:
the radio resource for transmitting feedback information for a data packet is determined according to a radio resource used for transmitting scheduling information for a first transmission of the data packet and the current counter value of the data packet, and wherein:
the scheduling information is a scheduling grant for allocating an uplink resource to the mobile terminal for transmitting the data packet on an uplink, or
the scheduling information indicates a downlink resource on which the data packet is transmitted to the mobile terminal,
the radio resource for transmitting feedback information for the data packet is determined according to the radio resource used for transmitting scheduling information for a first transmission of the data packet, and the number of transmissions that have taken place and a redundancy version utilized for transmitting the data packet,
there is a number of Nfr feedback resources reserved for feedback transmission in the communication system each being associated to a feedback resource index, and each feedback resource for providing feedback for a respective data packet is chosen based on the equation:

feedback resource index=(current transmission number)modulo $Nfr$:

7. The mobile communication system according to claim 1, wherein radio resources for the transmission of the feedback information for a respective data packet are reserved in the communication system, and the number of reserved radio resources depends on a maximum number of transmission for a packet allowed by the retransmission protocol.

8. The mobile communication system according to claim 1, wherein radio resources for the transmission of the feedback information for a respective data packet are reserved in the communication system, and the number of reserved radio resources depends on a number of redundancy versions used for transmitting the data packet and the number of redundancy versions is smaller than a maximum number of transmissions for a data packet in the retransmission protocol.

9. A mobile communication system, comprising:
a mobile terminal; and
a base station to communicate with the mobile terminal feedback information of a retransmission protocol for a transmitted data packet, wherein:
the feedback information for a respective data packet is transmitted on a radio resource having a location that is determined according to a counter value indicative of a number of transmissions that have taken place for the respective data packet to avoid collisions of the feedback information with parallel transmissions, wherein:
the radio resource for transmitting feedback information for a data packet is determined according to a radio resource used for transmitting scheduling information for a first transmission of the data packet and the current counter value of the data packet, and wherein:
the scheduling information is a scheduling grant for allocating an uplink resource to the mobile terminal for transmitting the data packet on an uplink, or
the scheduling information indicates a downlink resource on which the data packet is transmitted to the mobile terminal,
there is a number of Nfr feedback resources reserved for feedback transmission in the communication system each being associated to a feedback resource index, and each feedback resource for providing feedback for a respective data packet is chosen based on the equation:

feedback resource index=(current transmission number)modulo $Nfr$:

* * * * *